(12) United States Patent
Hendry

(10) Patent No.: US 12,418,671 B2
(45) Date of Patent: Sep. 16, 2025

(54) MEDIA FILE PROCESSING METHOD AND APPARATUS THEREFOR

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 18/026,959

(22) PCT Filed: Sep. 16, 2021

(86) PCT No.: PCT/KR2021/012664
§ 371 (c)(1),
(2) Date: Mar. 17, 2023

(87) PCT Pub. No.: WO2022/065799
PCT Pub. Date: Mar. 31, 2022

(65) Prior Publication Data
US 2023/0345028 A1 Oct. 26, 2023

Related U.S. Application Data

(60) Provisional application No. 63/081,348, filed on Sep. 22, 2020.

(51) Int. Cl.
*H04N 19/159* (2014.01)
*H04N 19/187* (2014.01)
*H04N 19/46* (2014.01)

(52) U.S. Cl.
CPC .......... *H04N 19/46* (2014.11); *H04N 19/159* (2014.11); *H04N 19/187* (2014.11)

(58) Field of Classification Search
CPC .... H04N 19/159; H04N 19/187; H04N 19/31; H04N 19/46; H04N 19/70; H04N 21/236; H04N 21/434; H04N 21/4402
See application file for complete search history.

(56) References Cited

U.S. PATENT DOCUMENTS

2016/0373771 A1* 12/2016 Hendry .............. H04N 19/30
2022/0086494 A1* 3/2022 Wang ............... H04N 21/8451
(Continued)

FOREIGN PATENT DOCUMENTS

CN 1963387 5/2007
CN 105556975 5/2016
(Continued)

OTHER PUBLICATIONS

Office Action in Chinese Appln. No. 202180064244.4, mailed on Mar. 7, 2024, 19 pages (with English translation).
(Continued)

*Primary Examiner* — Mainul Hasan
(74) *Attorney, Agent, or Firm* — Fish & Richardson P.C.

(57) ABSTRACT

A media file generation method according to the present document comprises the steps of: configuring first flag information about a target layer in an OLS, the first flag information indicating information about whether the maximum number of temporal sub-layers for inter-layer prediction exists; configuring second flag information about whether the target layer is an output layer; configuring the information about the maximum number of temporal sub-layers on the basis of the first flag information and the second flag information; and generating a media file including an operating point information sample group, wherein the information about the maximum number of temporal sub-layers is configured in the operating point information sample group on the basis of the first flag information being the same as 1 and the second flag information being the same as 0.

17 Claims, 6 Drawing Sheets

(56) References Cited

U.S. PATENT DOCUMENTS

2022/0103865 A1* 3/2022 Wang ............... H04N 21/85406
2022/0232259 A1* 7/2022 Wang ..................... H04N 19/30
2022/0394244 A1* 12/2022 Deng ................... H04N 19/159
2023/0007291 A1* 1/2023 Samuelsson ........... H04N 19/31

FOREIGN PATENT DOCUMENTS

| CN | 107750458 | 3/2018 |
|---|---|---|
| CN | 109792549 | 5/2019 |
| JP | 2015-195543 | 11/2015 |
| KR | 10-2015-0140777 | 12/2015 |
| KR | 10-2018-0019557 | 2/2018 |
| KR | 10-2018-0039626 | 4/2018 |
| KR | 10-2019-0009378 | 1/2019 |

OTHER PUBLICATIONS

Bross et al., "Versatile Video Coding (Draft 10)," JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 549 pages.

* cited by examiner

MEDIA FILE PROCESSING METHOD AND APPARATUS THEREFOR

CROSS-REFERENCE TO RELATED APPLICATIONS

This application is a National Stage application under 35 U.S.C. § 371 of International Application No. PCT/KR2021/012664, filed on Sep. 16, 2021, which claims the benefit of U.S. Provisional Application No. 63/081,348, filed on Sep. 22, 2020. The disclosures of the prior applications are incorporated by reference in their entirety.

TECHNICAL FIELD

The present disclosure relates to image coding technology, and more particularly, to a method and apparatus for processing a media file for coded image information in an image coding system.

BACKGROUND

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The technical problem of the present disclosure is to provide a method and apparatus for increasing image coding efficiency.

Another technical problem of the present disclosure is to provide a method and apparatus for generating a media file for coded image information.

Another technical problem of the present disclosure is to provide a method and apparatus for generating a media file for coded image information and meta data of the image information.

According to an embodiment of the present disclosure, a media file generating method performed by a media file generating apparatus is provided. The method comprises configuring first flag information for a target layer in an Output Layer Set (OLS), wherein the first flag information represents whether information on a maximum number of temporal sublayers for inter-layer prediction is present, configuring second flag information on whether the target layer is an output layer, configuring, based on the first flag information and the second flag information, the information on the maximum number of the temporal sublayers, and configuring a media file including an operating points information sample group, wherein the operating points information sample group includes the first flag information and the second flag information, and wherein the information on the maximum number of the temporal sublayers is configured in the operating points information sample group based on the first flag information equal to 1 and the second flag information equal to 0.

According to another embodiment of the present disclosure, an apparatus for generating a media file is provided. The media file generating apparatus comprises an image processing unit configuring first flag information for a target layer in an Output Layer Set (OLS), wherein the first flag information represents whether information on a maximum number of temporal sublayers for inter-layer prediction is present, configuring second flag information on whether the target layer is an output layer, and configuring, based on the first flag information and the second flag information, the information on the maximum number of the temporal sublayers, and a media file generation unit configuring a media file including an operating points information sample group, wherein the operating points information sample group includes the first flag information and the second flag information, and wherein the information on the maximum number of the temporal sublayers is configured in the operating points information sample group based on the first flag information equal to 1 and the second flag information equal to 0.

According to another embodiment of the present disclosure, a media file processing method performed by a media file processing apparatus is provided. The method comprises obtaining a media file comprising an operating points information sample group and parsing the operating points information sample group, wherein parsing the operating points information sample group comprises, parsing first flag information for a target layer in an Output Layer Set (OLS), wherein the first flag information represents whether information on a maximum number of temporal sublayers for inter-layer prediction is present, parsing second flag information on whether the target layer is an output layer, and parsing, based on the first flag information and the second flag information, the information on the maximum number of the temporal sublayers, wherein the operating points information sample group includes the first flag information and the second flag information, and wherein the information on the maximum number of the temporal sublayers is configured in the operating points information sample group based on the first flag information equal to 1 and the second flag information equal to 0.

According to another embodiment of the present disclosure, a media file processing apparatus is provided. The apparatus comprises a receiving unit obtaining a media file comprising an operating points information sample group and a media file processing unit parsing the operating points information sample group, wherein a process of parsing the operating points information sample group comprises, parsing first flag information for a target layer in an Output Layer Set (OLS), wherein the first flag information represents whether information on a maximum number of temporal sublayers for inter-layer prediction is present, parsing second flag information on whether the target layer is an output layer, and parsing, based on the first flag information and the second flag information, the information on the maximum number of the temporal sublayers, wherein the operating points information sample group includes the first flag information and the second flag information, and wherein the information on the maximum number of the temporal sublayers is configured in the operating points information sample group based on the first flag information equal to 1 and the second flag information equal to 0.

According to another embodiment of the present disclosure, a computer-readable digital storage medium in which a media file is stored is provided. In the computer-readable digital storage medium, the method comprises configuring first flag information for a target layer in an Output Layer Set (OLS), wherein the first flag information represents whether information on a maximum number of temporal sublayers for inter-layer prediction is present, configuring second flag information on whether the target layer is an output layer, configuring, based on the first flag information and the second flag information, the information on the maximum number of the temporal sublayers, and generating a media file including an operating points information sample group, wherein the operating points information sample group includes the first flag information and the second flag information, and wherein the information on the maximum number of the temporal sublayers is configured in the operating points information sample group based on the first flag information equal to 1 and the second flag information equal to 0.

According to the present disclosure, since values of information indicating a maximum number of temporal layers for inter-layer prediction in a layer prediction may vary depending on the OLS to which the layer belongs, whether the information is signaled or not may be determined in consideration of flag information and whether the layer is an output layer, and through this, signaling redundancy for media file delivery can be reduced and overall coding efficiency can be improved.

According to the present disclosure, signaling of information on layer dependency may be performed in the same manner as proposed in various embodiments, thereby signaling redundancy for media file delivery can be reduced and overall coding efficiency can be improved.

DETAILED DESCRIPTION

Figure 1:
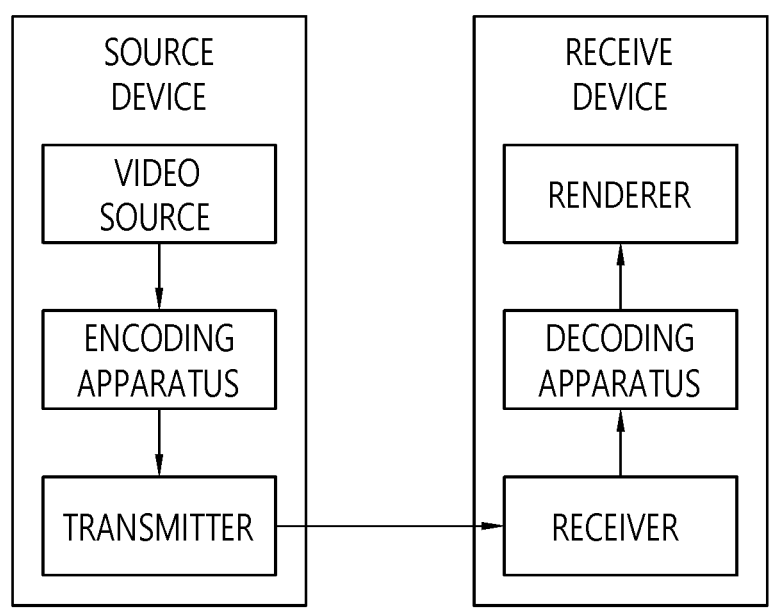
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bit stream.

The transmitter may transmit the encoded image/image information or data output in the form of a bit stream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bit stream and transmit the received bit stream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
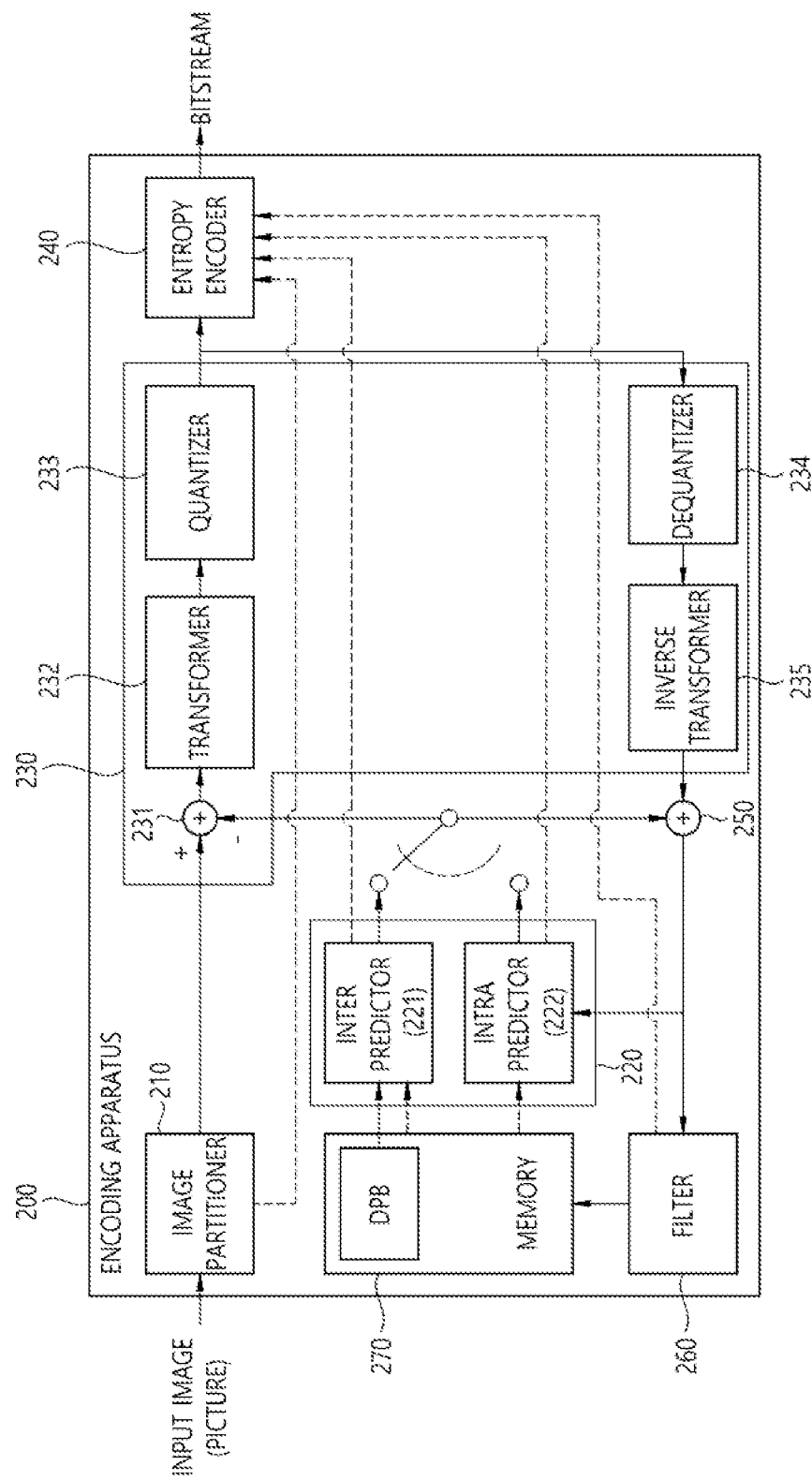
FIG. 2 is a schematic diagram illustrating a configuration of a video/image encoding apparatus to which the embodiments of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bit stream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bit stream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bit stream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bit stream. The bit stream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bit stream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
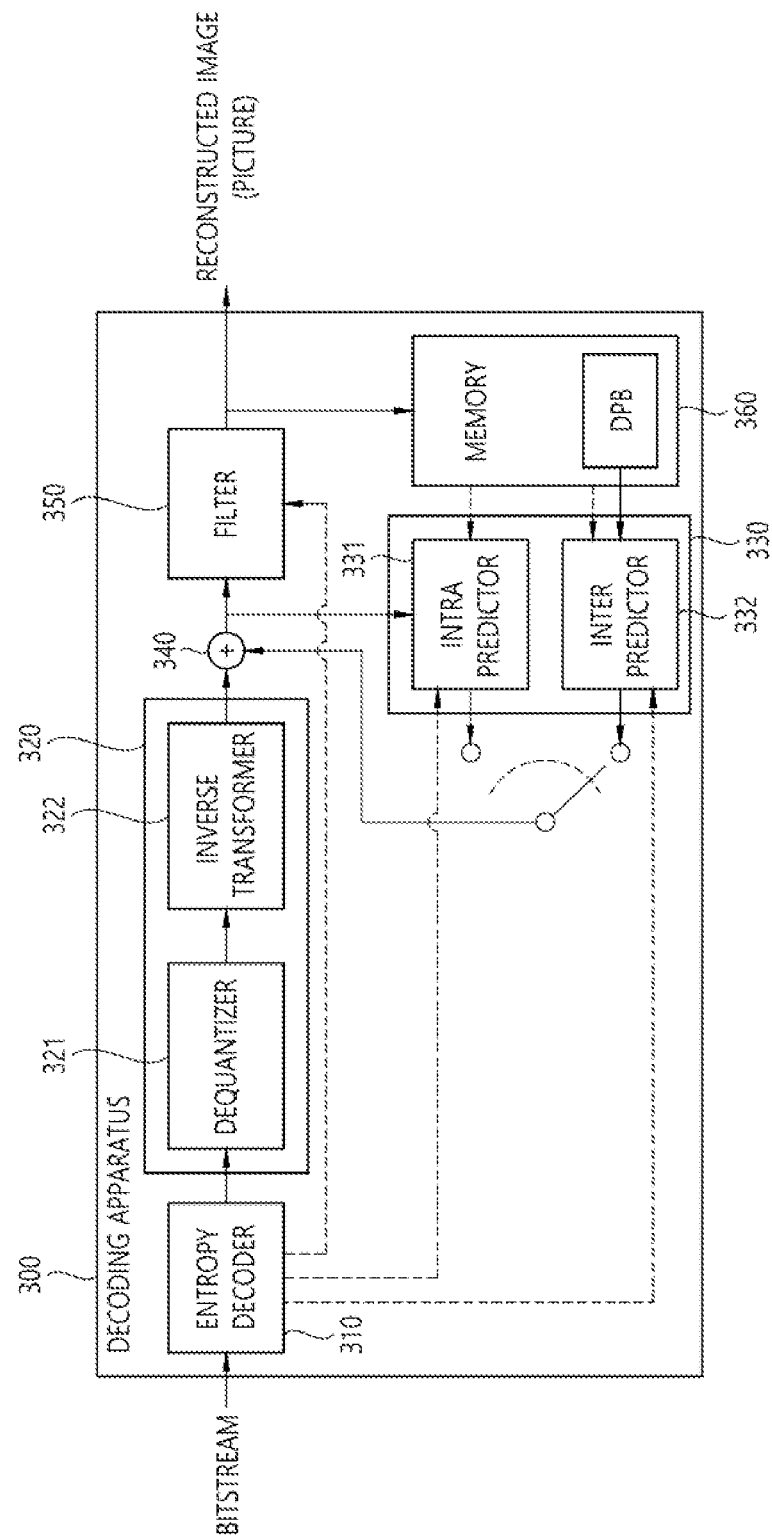
FIG. 3 is a schematic diagram illustrating a configuration of a video/image decoding apparatus to which the embodiments of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bit stream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bit stream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bit stream, and the received signal may be decoded through the entropy decoder 310. For example, the entropy decoder 310 may parse the bit stream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bit stream. For example, the entropy decoder 310 decodes the information in the bit stream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bit stream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be equally applied or applied correspondingly to the filter 350, the inter predictor 332, and the intra predictor 331 of the decoding apparatus 300.

Meanwhile, the above-described encoded image/video information may be configured based on a media file format to generate a media file. For example, encoded image/video information may form a media file (segment) based on one or more NAL unit/sample entries for the encoded image/video information. The media file may include a sample entry and a track. For example, a media file (segment) may include various records, and each record may include image/video related information or media file format related information. Also, for example, one or more NAL units may be stored in a configuration record (or decoder configuration record, or VVC decoder configuration record) field of a media file. Here, the field may also be called a syntax element. Also, for example, the media file may include VvcOperatingPointsRecord (an operating point information sample group) and/or OperatingPointGroupBox (an operating point entity group) described later.

For example, ISO Base Media File Format (ISOBMFF) may be used as a media file format to which the method/embodiment disclosed in the present disclosure may be applied. ISOBMFF may be used as the basis for many codec encapsulation formats such as AVC file format, HEVC file format and/or VVC file format and many multimedia container formats such as MPEG-4 file format, 3GPP file format (3GP) and/or DVB file format. Also, in addition to continuous media such as audio and video, static media such as images and metadata may be stored in a file according to ISOBMFF. A file structured according to ISOBMFF may be used for various purposes such as local media file playback, progressive downloading of a remote file, segments for Dynamic Adaptive Streaming over HTTP (DASH), containers and packetization instructions of content to be streamed, and recording of received real-time media streams.

A 'box' described later may be an elementary syntax element of ISOBMFF. An ISOBMFF file may consist of a sequence of boxes, and each box may contain other boxes. For example, a movie box (a box whose grouping type is 'moov') may include metadata for continuous media streams in a media file, and each stream may be represent as a track in a file. Metadata for a track may be included in a track box (a box whose grouping type is 'trak'), and media content of a track may be included in a media data box (a box whose grouping type is 'mdat') or directly in a separate file. The media content of a track may consist of a sequence of samples, such as audio or video access units. For example, ISOBMFF may include a media track including an elementary media stream, media transmission instructions. ISOBMFF may specify types of tracks such as a hint track representing the received packet stream and a timed metadata track including time synchronized metadata.

Also, ISOBMFF is designed for storage, but is also very useful for streaming such as progressive download or DASH. For streaming purposes, movie fragments defined in ISOBMFF may be used. A fragmented ISOBMFF file may represent, for example, two tracks related to video and audio. For example, if random access is included after receiving a 'moov' box, all movie fragments 'moof' may be decoded along with related media data.

In addition, the metadata of each track may include a list of sample description entries providing a coding or encapsulation format used in the track and initialization data necessary to process the format. Also, each sample may be associated with one of the sample description entries of the track.

Using ISOBMFF, sample-specific metadata may be specified by various mechanisms. Specific boxes within a sample table box (a boxe whose grouping type is 'stbl') may be standardized to correspond to general requirements. For example, a sync sample box (a box whose grouping type is 'stss') may be used to list random access samples of a track. The sample grouping mechanism allows to map samples according to a four-character grouping type into groups of samples that share the same property specified by a sample group description entry in the file. Several grouping types may be specified in ISOBMFF.

On the other hand, a 'sample' described later may be all data related to a single time or single element in one of three sample arrays (Y, Cb, Cr) representing a picture. For example, when the term 'sample' is used in the context of a track (of a media file format), it may refer to all data related to a single time of the track. Here, the time may be a decoding time or a composition time. In addition, for example, when the term 'sample' is used in the context of a picture, that is, when it is used with the phrase "luma sample", it may refer to a single element in one of the three sample arrays representing the picture.

Meanwhile, in order to store VVC content, the following three types of elementary streams may be defined.
- a video elementary stream that does not include any parameter sets. Here, all parameter sets may be stored in a sample entry or sample entries.
- a video and parameter set elementary stream that may include parameter sets, and may also have the parameter sets stored in their sample entry or sample entries.
- a non-VCL elementary stream that includes non-VCL NAL units synchronized with the elementary stream included in a video track. Here, the VVC non-VCL track does not include a parameter set in sample entries.

Meanwhile, the operating points information of the ISO based media file format (ISOBMF) for VVC may be signaled as a sample in a group box whose grouping type is 'vopi' or an entity group whose grouping type is 'opeg'. Here, the operating point may be a temporal subset of the OLS identified by an Output Layer Set (OLS) index and a highest value of TemporalId. Each operating point may be associated with a profile, tier, and level (i.e., PTL) that defines the conformance point of the operating point. The operating points information may be needed to identify a sample and a sample entry for each operating point.

Information on the constitution of the operating points may be provided to applications using various operating points and an operating point information sample group ('vopi') provided in a given VVC bitstream. Each operating point is associated with OLS, the maximum TemporalId value, profile, level and tier signaling. All of the above information may be captured by the 'vopi' sample group. Apart from the above information, the sample group may also provide dependency information between layers.

Meanwhile, when one or more VVC tracks exist for a VVC bitstream and an operating point entity group does not exist for the VVC bitstream, all of the following items may be applied.
- Among the VVC tracks for the VVC bitstream, there shall be only one track that carries a 'vopi' sample group.
- All the other VVC tracks of the VVC bitstream shall have a track reference of type 'oref' for the track that carries the 'vopi' sample group.

In addition, for any specific sample in a given track, a temporally collocated sample in another track may be defined as a sample having the same decoding time as the specific sample. For each sample SN of a track TN that has an 'oref' track reference for a track Tk that carries a 'vopi' sample group, the following may apply.
- If there is a temporally collocated sample Sk in the track Tk, the sample SN may be associated with the same 'vopi' sample group entity as the sample Sk.
- Otherwise, sample SN may be associated with the same vopi' sample group entity as the last of samples in the track Tk that precedes sample SN in decoding time.

When several VPSs are referenced in the VVC bitstream, several entities may need to be included in a sample group description box with grouping_type 'vopi'. In the more common case where a single VPS is present, it may be recommended to use the default sample group mechanism defined in ISO/IEC 14496-12 and include the operating point information sample group in the sample table box, rather than including it in each track fragment.

Also, grouping_type_parameter may not be defined for SampleToGroupBox whose grouping type is 'vopi'.

The 'vopi' sample group including the above-described operating point information, that is, the syntax of the operating point information sample group may be as shown in the table below.

TABLE 1

```
class VvcOperatingPointsRecord {
    unsigned int (8) num_profile_tier_level_minus1;
    for (i=0; i<=num_profile_tier_level_minus1; i++) {
        unsigned int (8) ptl_max_temporal_id[i];
        VvcPTLRecord (ptl_max_temporal_id[i]+1) ptl[i];
    }
    unsigned int (1) all_independent_layers_flag;
    bit (7) reserved = 0;
    if (all_independent_layers_flag) {
        unsigned int (1) each_layer_is_an_ols_flag;
        bit (7) reserved = 0;
    } else
        unsigned int (8) ols_mode_idc;
    unsigned int (16) num_operating_points;
    for (i=0; i<num_operating_points) {
        unsigned int (16) output_layer_set_idx;
        unsigned int (8) ptl_idx;
        unsigned int (8) max_temporal_id;
        unsigned int (8) layer_count;
        for (j=0; j<layer_count; j++) {
            unsigned int (6) layer_id;
            unsigned int (1) is_outputlayer;
            bit (1) reserved = 0;
        }
        bit (6) reserved = 0;
        unsigned int (1) frame_rate_info_flag;
        unsigned int (1) bit_rate_info_flag
        if (frame_rate_info_flag) {
            unsigned int (16) avgFrameRate;
            bit (6) reserved = 0;
            unsigned int (2) constant FrameRate;
        }
        if (bit_rate_info_flag) {
            unsigned int (32) maxBitRate;
            unsigned int (32) avgBitRate;
        }
    }
    unsigned int (8) max_layer_count;
    for (i=0; i<max_layer_count; i++) {
        unsigned int (8) layerID;
        unsigned int (8) num_direct_ref_layers;
        for (j=0; j<num_direct_ref_layers; j++)
            unsigned int (8) direct_ref_layerID;
        unsigned int (8) max_tid_il_ref_pics_plus1;
    }
}
class VvcOperatingPoints Information extends Visual
SampleGroupEntry
('vopi') {
    VvcOperatingPointsRecord oinf;
}
```

In addition, semantics of the syntax of the operating point information sample group may be as shown in the following table.

TABLE 2 num_profile_tier_level_minus1 plus 1 gives the number of following
   profiles, tier, and level combinations as well as the associated fields.
ptl_max_temporal_id[i] : Gives the maximum TemporalID of NAL units of
   the associated bitstream for the specified i-th profile, tier, and level structure.
      NOTE: The semantics of ptl_max_temporal_id [i] and
      max_temporal_id of an operating point, given below, are different even
      though they may carry the same numerical value.
ptl[i] specifies the i-th profile_, tier, and level structure.
all_independent_layers_flag, each_layer_is_an_ols_flag,
   ols_mode_idc and max_tid_il_ref_pics_plus1 are defined in
   ISO/IEC 23090-3.
num_operating_points : Gives the number of operating points for which the
   information follows.
output_layer_set_idx is the index of the output layer set that defines the
   operating point. The mapping between output_layer_set_idx and the
   layer_id values shall be the same as specified by the VPS for an output layer
   set with index output_layer_set_idx.
ptl_idx : Signals the zero-based index of the listed profile, level, and tier
   structure for the output layer set with index output_layer_set_idx.
max_temporal_id: Gives the maximum TemporalId of NAL units of this
   operating point.
      NOTE: The maximum TemporalId value indicated in the layer information sample
      group has different semantics from the maximum TemporalId indicated here. However,
      they may carry the same literal numerical values.
layer_count: This field indicates the number of necessary layers, as defined
   ISO/IEC 23090-3, of this operating point.
layer_id: provides the nuh_layer_id values for the layers of the operating point.
is_outputlayer: A flag that indicates if the layer is an output layer or not. A one
   indicates an output layer.
frame_rate_info_flag equal to 0 indicates that no frame rate information is
   present for the operating point. The value 1 indicates that frame rate
   information is present for the operating point.
bit_rate_info_flag equal to 0 indicates that no bitrate information is
   present for the operating point. The value 1 indicates that bitrate information is
   present for the operating point.
avgFrameRate gives the average frame rate in units of frames/(256 seconds) for
   the operating point. Value 0 indicates an unspecified average frame rate.
constantFrameRate equal to 1 indicates that the stream of the operating point
   is of constant frame rate. Value 2 indicates that the representation of each
   temporal layer in the stream of the operating point is of constant frame rate.
   Value 0 indicates that the stream of the operating point may or may not be of
   constant frame rate.
maxBitRate gives the maximum bit rate in bits/second of the stream of the
   operating point, over any window of one second.
avgBitRate gives the average bit rate in bits/second of the stream of the
   operating point.
max_layer_count : The count of all unique layers in all of the operating points
   that relate to this associated base track.
layerID: nuh_layer_id of a layer for which the all the direct reference layers are
   given in the following loop of direct_ref_layerID.
num_direct_ref_layers : The number of direct reference layers for the layer
   with nuh_layer_id equal to layerID.
direct_ref_layerID: nuh layer_id of the direct reference layer.

For example, referring to Table 2, a value obtained by adding 1 to the syntax element num_profile_tier_level_minus1 may represent the number of fields related to profiles, tier, and level combinations.

Also, for example, referring to Table 2, the syntax element ptl_max_temporal_id[i] may represent a maximum TemporalID of NAL units of the bitstream for the specified i-th profile, tier, level (profiles, tier, level structure, PTL) structure. That is, for example, the syntax element ptl_max_temporal_id[i] may represent the maximum value of the temporal ID (TemporalID) of the NAL unit of the bitstream for the i-th PTL structure. Meanwhile, ptl_max_temporal_id[i] and max_temporal_id of an operation point may transmit the same value, but the semantics of the syntax elements are different.

Also, for example, referring to Table 2, the syntax element ptl[i] may indicate the i-th PTL structure.

Also, for example, referring to Table 2 above, syntax elements all_independent_layers_flag, each_layer_is_an_ols_flag, ols_mode_idc, and max_tid_il_ref_pics_plus1 may be as defined in ISO/IEC 23090-3. Here, ISO/IEC 23090-3 means a versatile video coding (VVC) standard.

Specifically, for example, the syntax element all_independent_layers_flag may represent whether all layers of a bitstream for an operation point information sample group are independently coded without using inter-layer prediction. For example, all_independent_layers_flag being equal to 1 may indicate that all layers are coded independently without using inter-layer prediction. Also, for example, all_independent_layers_flag being equal to 0 may indicate that at least one or more layers may use inter-layer prediction. When the all_independent_layers_flag does not exist, the all_independent_layers_flag may be inferred as equal to 1.

In addition, for example, the syntax element each_layer_is_an_ols_flag may represent that each output layer set (OLS) (of the bitstream) for the operation point information sample group includes only one layer and whether one layer including each layer is OLS which is an unique output layer. For example, each_layer_is_an_ols_flag being equal to 1 may represent that each OLS (Output Layer Set) includes only one layer and one layer including each layer is the only output layer OLS. Also, for example, each_layer_is_an_ols_flag equal to 0 may represent that at least one OLS includes two or more layers.

Also, for example, a syntax element vps_ols_mode_idc may indicate a mode of OLS. For example, vps_ols_mode_idc being equal to 0 indicates that the total number of OLSs is equal to vps_max_layers_minus1+1, an i-th OLS includes layers having layer indices from 0 to i, and only the highest layer of each OLS is an output layer. Also, for example, vps_ols_mode_idc being equal to 1 may indicate that the total number of OLSs is equal to vps_max_layers_minus1+1, an i-th OLS includes layers having layer indices from 0 to i, and all layers of each OLS are output layers. In addition, for example, for vps_ols_mode_idc being equal to 2 it may represent that the total number of OLSs is explicitly signaled, an output layer of each OLS is explicitly signaled, and layers other than the output layer are a layer that is a direct or an indirect reference layer.

Also, for example, the syntax element max_tid_il_ref_pics_plus1 may indicate a maximum temporal sublayer required for inter-layer prediction in a layer. That is, for example, the syntax element max_tid_il_ref_pics_plus1 may indicate the maximum number of temporal sublayers required for inter-layer prediction in a layer. For example, a value obtained by subtracting 1 from the syntax element max_tid_il_ref_pics_plus1 may indicate that the maximum number of temporal sublayers required for inter-layer prediction in a layer. Also, for example, max_tid_il_ref_pics_plus1 being equal to 0 may represent that a picture, which is not an IRAP (Intra Random Access Point) picture and a GDR (Gradual Decoding Refresh) picture having ph_recovery_poc_cnt equal to 0, of a layer having a layer ID equal to layer_id is not used as an inter-layer reference picture (ILRP) for decoding a picture of other layer in the OLS. Here, ILRP may indicate a reference picture used for inter-layer prediction. In addition, for example, max_tid_il_ref_pics_plus1 greater than 0 may represent that a picture of a layer having TemporalId greater than max_tid_il_ref_pics_plus1-1 (i.e., max_tid_il_ref_pics_plus1 minus 1) are not used as ILRP for decoding a picture in in other layers of OLS, and an APS with nuh_layer_id equal to layer_id and TemporalId greater than max_tid_il_ref_pics_plus1-1 (i.e., a value obtained by subtracting 1 from max_tid_il_ref_pics_plus1) is not referenced. Meanwhile, when max_tid_il_ref_pics_plus1 does not exist, the value of max_tid_il_ref_pics_plus1 may be considered equal to max_temporal_id.

For example, referring to Table 2 above, the syntax element num_operating_points may represent the number of operating points for information to be described later.

Also, for example, referring to Table 2, the syntax element output_layer_set_idx may be an index of an OLS defining an operation point. That is, for example, output_layer_set_idx may indicate OLS. The mapping between output_layer_set_idx and layer_id values may be the same as that specified in a VPS for the OLS with index output_layer_set_idx (i.e., the OLS indicated by output_layer_set_idx).

Also, for example, referring to Table 2, the syntax element ptl_idx may signal an index starting from 0 of a PTL structure listed for an OLS having an index output_layer_set_idx. That is, for example, ptl_idx may indicate a PTL structure for OLS whose index is output_layer_set_idx.

Also, for example, referring to Table 2, the syntax element max_temporal_id may indicate the maximum TemporalId of the NAL unit of an operation point. Meanwhile, the maximum TemporalId value indicated in the layer information sample group may have the same value as the TemporalId indicated by max_temporal_id, but the semantics of the syntax elements are different.

Also, for example, referring to Table 2, the syntax element layer_count may indicate the number of layers required for an operation point as defined in ISO/IEC 23090-3.

Also, for example, referring to Table 2, the syntax element layer_id may indicate a nuh_layer_id value for a layer of an operation point. That is, for example, the syntax element layer_id may indicate a layer ID value for a layer of an operation point.

Also, for example, referring to Table 2 above, the syntax element is_outputlayer may indicate whether a layer is an output layer. For example, is_outputlayer being equal to 1 may indicate that the layer is the output layer.

Also, for example, referring to Table 2, the syntax element frame_rate_info_flag may indicate whether frame rate information for an operation point exists. For example, frame_rate_info_flag being equal to 0 may indicate that frame rate information for an operation point does not exist. Also, for example, frame_rate_info_flag being equal to 1 may indicate that frame rate information for an operation point exists.

Also, for example, referring to Table 2, the syntax element bit_rate_info_flag may indicate whether bitrate information for an operation point exists. For example, bit_rate_info_flag being equal to 0 may indicate that bitrate information for an operation point does not exist. Also, for example, bit_rate_info_flag being equal to 1 may indicate that bitrate information for an operation point exists.

Also, for example, referring to Table 2, the syntax element avgFrameRate may provide an average frame rate for an operation point in units of frame/(256 seconds). A value of 0 may indicate an unspecified average frame rate.

Also, for example, referring to Table 2, the syntax element constantFrameRate may indicate a constant frame rate for a stream of an operation point. For example, constantFrameRate being equal to 1 may indicate that the stream of the operating point is a constant frame rate. A constantFrameRate being equal to a value of 2 may indicate that the representation of each temporal layer in the stream of the operation point is a constant frame rate. A constantFrameRate being equal to a value of 0 may indicate that the stream of the operation point may or may not be of a constant frame rate.

Also, for example, referring to Table 2, the syntax element maxBitRate may provide a maximum bit rate of a stream of an operation point in units of bits/second in all windows of 1 second.

Also, for example, referring to Table 2, the syntax element max_layer_count may indicate the number of all unique layers of all operation points associated with an associated base track.

Also, for example, referring to Table 2, the syntax element layerID may indicate nuh_layer_id of a layer in which all direct reference layers are provided in a following loop of direct_ref_layerID.

Also, for example, referring to Table 2, the syntax element num_direct_ref_layers may indicate the number of direct reference layers for a layer having nuh_layer_id equal to layerID.

Also, for example, referring to Table 2, the syntax element direct_ref_layerID may indicate nuh_layer_id of a direct reference layer.

Also, for example, an operating point entity group may be defined to provide profile level information of the operating point and track mapping for the operating point.

In the case of aggregating samples of the track mapped to the operating point described in the operating point entity group, the implicit reconstruction process does not require removing any further NAL units to result in a conforming VVC bitstream. A track belonging to the operating point entity group shall have a track reference of type 'oref' for group_id indicated in the operating point entity group.

In addition, all entity_id values included in the operating point entity group shall belong to the same VVC bitstream. When present, OperatingPointGroupBox is included in GroupsListBox in the movie-level MetaBox and not included in the file-level or track-level MetaBox. Here, OperatingPointGroupBox may represent the operating point entity group.

The above-described syntax of the operating point entity group may be as shown in the table below.

TABLE 3

```
aligned (8) class OperatingPointGroupBox extends
EntityToGroupBox ('opeg', 0, 0)
{
    unsigned int (8) num_profile_tier_level_minus1;
    for (i=0; i<=num_profile_tier_level_minus1; i++)
        VvcPTLRecord (0) opeg_ptl[i];
    unsigned int (16) num_operating_points;
```

TABLE 3-continued

```
    for (i=0; i<num_operating_points)
        unsigned int (16) output_layer_set_idx;
        unsigned int (8) ptl_idx;
        unsigned int (8) max_temporal_id;
        unsigned int (8) layer_count;
        for (j=0; j<layer_count; j++) {
            unsigned int (6) layer_id;
            unsigned int (1) is_outputlayer;
            bit (1) reserved = 0;
        }
        bit (6) reserved = 0;
        unsigned int (1) frame_rate_info_flag
        unsigned int (1) bit_rate_info_flag
        if (frame_rate_info_flag) {
            unsigned int (16) avgFrameRate;
            bit (6) reserved = 0;
            unsigned int (2) constantFrameRate;
        }
        if (bit_rate_info_flag) {
            unsigned int (32) maxBitRate;
            unsigned int (32) avgBitRate;
        }
        unsigned int (8) entity_count;
        for (j=0; j<entity_count; j++) {
            unsigned int (8) entity_idx;
        }
    }
}
```

In addition, semantics of the syntax of the operating point entity group may be as shown in the following table.

TABLE 4 num_profile_tier_level_minus1 plus 1 gives the number of following
  profiles, tier, and level combinations as well as the associated fields.
opeg_ptl[i] specifies the i-th profile, tier, and level structure.
num_operating_points: Gives the number of operating points for which the
  information follows.
output_layer_set_idx is the index of the output layer set that defines the
  operating point. The mapping between output_layer_set_idx and the
  layer_id values shall be the same as specified by the VPS for an output layer set
  with index output_layer_set_idx.
ptl_idx: Signals the zero-based index of the listed profile, level, and tier structure for
  the output layer set with index output_layer_set_idx.
max_temporal_id: Gives the maximum TemporalId of NAL units of this operating
  point.
  NOTE: The maximum TemporalId value indicated in the layer information sample group
  has different semantics from the maximum TemporalId indicated here. However, they may
  carry the same literal numerical values.
layer_count: This field indicates the number of necessary layers, as defined
  ISO/IEC 23090-3, of this operating point.
layer_id: provides the nuh_layer_id values for the layers of the operating point.
is_outputlayer: A flag that indicates if the layer is an output layer or not. A one
  indicates an output layer.
frame_rate_info_flag equal to 0 indicates that no frame rate information is
  present for the operating point. The value 1 indicates that frame rate information is
  present for the operating point.
bit_rate_info_flag equal to 0 indicates that no bitrate information is present
  for the operating point. The value 1 indicates that bitrate information is present for
  the operating point.
avgFrameRate gives the average frame rate in units of frames/(256 seconds) for the
  operating point. Value 0 indicates an unspecified average frame rate.
constantFrameRate equal to 1 indicates that the stream of the operating point is of
  constant frame rate. Value 2 indicates that the representation of each temporal layer
  in the stream of the operating point is of constant frame rate. Value 0 indicates that
  the stream of the operating point may or may not be of constant frame rate.
maxBitRate gives the maximum bit rate in bits/second of the stream of the operating
  point, over any window of one second.
avgBitRate gives the average bit rate in bits/second of the stream of the operating
  point.
entity_count specifies the number of tracks that are present in an operating point.
entity_idx specifies the index to the entity_id list in the entity group that
  belongs to an operating point.

Also, for example, a media file may include decoder configuration information for image/video content. That is, the media file may include a VVC decoder configuration record including decoder configuration information.

When the VVC decoder configuration record is stored in a sample entry, the VVC decoder configuration record may include the size of a length field used for each sample to indicate the length of a NAL unit included in the VVC decoder configuration record as well as parameter sets. The VVC decoder configuration record may be framed externally (the size of the VVC decoder configuration record is supplied by the structure including the VVC decoder configuration record).

In addition, the VVC decoder configuration record may include a version field. For example, a version of the present disclosure may define version 1 of the VVC decoder configuration record. Incompatible changes to the VVC decoder configuration record may be indicated by a change of version number. If the version number is not recognized, readers shall not attempt to decode the VVC decoder configuration record or the stream to which the record applies.

Compatible extensions to the VVC decoder configuration record may not change the configuration version code. A reader should be prepared to ignore unrecognized data that goes beyond the definition of data that the reader understands.

When a track includes a VVC bitstream natively or resolves through 'subp' track references, VvcPtlRecord shall be present in the decoder configuration record. In addition, when ptl_present_flag is 0 in the decoder configuration record of a track, the track shall have an 'oref' track reference.

When the stream described in the VVC decoder configuration record is decoded, values of syntax elements of VvcPTRecord, chroma_format_idc, and bit_depth_minus8 may be valid for all parameter sets that are activated. In particular, the following restrictions may apply.

Profile indication general_profile_idc indicates the profile to which the stream associated with this configuration record conforms.

Tier indication general_tier_flag may indicate a tier equal to or greater than the highest tier indicated in all the parameter sets.

Each bit in general_constraint_info may be set only if all the parameter sets set the corresponding bit.

Level indication general_level_idc may indicate a level of capability equal to or greater than the highest level indicated for the highest tier in parameter sets.

In addition, the following constraints may be applied to chroma_format_idc.

If the value of sps_chroma_format_idc defined in ISO/IEC 23090-3 is the same in all SPSs referenced by NAL units of a track, chroma_format_idc sall be equal to sps_chroma_format_idc.

Otherwise, if ptl_present_flag is equal to 1, chroma_format_idc shall be equal to vps_ols_dpb_chroma_format [output_layer_set_idx] defined in ISO/IEC 23090-3.

Otherwise (that is, if the above conditions are not satisfied), chroma_format_idc is not present.

An explicit indication may be provided in the VVC decoder configuration record about the chroma format and bit depth as well as other important format information used by the VVC video elementary stream. If the two sequences differ in color space indications in their VUI information, two different VVC sample entries may be required.

Also, for example, in the VVC decoder configuration record, there is a set of arrays to carry initialization NAL units. The NAL unit types may be restricted to indicate DCI, VPS, SPS, PPS, prefix APS and prefix SEI NAL units only. NAL unit types reserved in ISO/IEC 23090-3 and the present disclosure may be defined in the future, and the reader may have to ignore arrays with reserved or disallowed values of NAL unit types.

Meanwhile, the arrays may be in the order of DCI, VPS, SPS, PPS, prefix APS, and prefix SEI.

The syntax of the above-described VVC decoder configuration record may be as shown in the table below.

TABLE 5

```
aligned (8) class VvcPTLRecord (num_sublayers) {
    unsigned int (8) num_bytes_constraint_info;
    unsigned int (7) general_profile_ idc;
    unsigned int (1) general_tier_flag;
    unsigned int (8) general_level_idc;
    unsigned int (1) ptl_frame_only_constraint_flag;
    unsigned int (1) ptl_multilayer_enabled_flag;
    if (num_bytes_constraint_info > 0)
        unsigned int (8*num_bytes_constraint_info - 2)
    general_constraint_info; for (i=num_sublayers - 2; i >= 0; i--)
        unsigned int (1) ptl_sublayer_level_present_flag[i];
    for (j=num_sublayers; j<=8 && num_sublayers > 1; j++)
        bit (1) ptl_reserved_zero_bit = 0;
    for (i=num_sublayers-2; i >= 0; i--)
        if (ptl_sublayer_level_present[i])
            unsigned int (8) sublayer_level_idc[i];
    unsigned int (8) num_sub_profiles;
    for (j=0; j < num_sub_profiles; j++)
        unsigned int (32) general_sub_profile_idc;
}
aligned (8) class VvcDecoderConfigurationRecord {
    unsigned int (8) configurationVersion = 1;
    unsigned int (16) avgFrameRate;
    unsigned int (2) constantFrameRate;
    unsigned int (3) numTemporalLayers;
    unsigned int (2) lengthSizeMinusOne;
    unsigned int (1) ptl_present_flag;
    if (ptl_present_flag) {
        VvcPTLRecord (numTemporalLayers) track_ptl;
        unsigned int (16) output_layer_set_idx;
    }
    unsigned int (1) chroma_format_present_flag;
    if (chroma_format_present_flag)
        unsigned int (2) chroma_format_idc;
    else
        bit (2) reserved = '11'b;
    unsigned int (1) bit_depth_present_flag;
    if (bit_depth_present_flag)
        unsigned int (3) bit_depth_minus8;
    else
        bit (3) reserved = '111'b;
    unsigned int (1) reserved= '1'b;
    unsigned int (8) numOfArrays;
    for (j=0; j < numOfArrays; j++) {
        unsigned int (1) array_completeness;
        bit (1) reserved = 0;
        unsigned int (6) NAL_unit_type;
        unsigned int (16) numNalus;
        for (i=0; i< numNalus; i++) {
            unsigned int (16) nalUnitLength;
            bit (8*nalUnitLength) nalUnit;
        }
    }
}
```

In addition, semantics of the syntax of the VVC decoder configuration record may be as shown in the following table.

TABLE 6 general_profile_idc, general_tier_flag, general_sub_profile_idc,
  general_constraint_info, general_level_idc,
  ptl_frame_only_constraint_flag, ptl_multilayer_enabled_flag,
  sublayer_level_present, and sublayer_level_idc[i] contain the matching
  values for the fields general_profile_idc, general_tier_flag, general_sub_profile_idc, the
  bits in general_constraint_info( ), general_level_idc, ptl_multilayer_enabled_flag,
  ptl_frame_only_constraint_flag, sublayer_level_present, and sublayer_level_idc[i] as
  defined in ISO/IEC 23090-3, for the stream to which this configuration record applies.
avgFrameRate gives the average frame rate in units of frames/(256 seconds), for the
  stream to which this configuration record applies. Value 0 indicates an unspecified
  average frame rate.
constantFrameRate equal to 1 indicates that the stream to which this configuration
  record applies is of constant frame rate. Value 2 indicates that the representation of
  each temporal layer in the stream is of constant frame rate. Value 0 indicates that the
  stream may or may not be of constant frame rate.
numTemporalLayers greater than 1 indicates that the track to which this configuration
  record applies is temporally scalable and the contained number of temporal layers (also
  referred to as temporal sublayer or sublayer in ISO/IEC 23090-3) is equal to
  numTemporalLayers. Value 1 indicates that the track to which this configuration record
  applies is not temporally scalable. Value 0 indicates that it is unknown whether the
  track to which this configuration record applies is temporally scalable.
lengthSizeMinusOne plus 1 indicates the length in bytes of the NALUnitLength field
  in a VVC video stream sample in the stream to which this configuration record applies.
  For example, a size of one byte is indicated with a value of 0. The value of this field shall
  be one of 0, 1, or 3 corresponding to a length encoded with 1, 2, or 4 bytes, respectively.
ptl_present_flag equal to 1 specifies that the track contains a VVC bitstream
  corresponding to a specific output layer set. ptl_present_flag equal to 0 specifies
  that the track may not contain a VVC bitstream corresponding to a specific output layer
  set, but rather may contain one or more individual layers that do not form an output
  layer set or individual sublayers excluding the sublayer with TemporalId equal to 0.
num_sub_profiles defines the number of sub profiles indicated in the decoder
  configuration record.
track_ptl specifies the profile, tier, and level of the output layer set represented by the
  VVC bitstream contained in the track.
output_layer_set_idx specifies the output layer set index of an output layer set
  represented by the VVC bitstream contained in the track. The value of
  output_layer_set_idx may be used as the value of the TargetOlsIdx variable
  provided by external means to the VVC decoder, as specified in ISO/IEC 23090-3, for
  decoding the bitstream contained in the track.
chroma_format_present_flag equal to 0 specifies that chroma_format_idc is not
  present. chroma_format_present_flag equal to 1 specifies that
  chroma_format_idc is present.
chroma_format_idc indicates the chroma format that applies to this track. The
  following constraints apply for chroma_format_idc:
  - If the value of sps_chroma_format_idc, as defined in ISO/IEC 23090-3, is the
    same in all SPSs referenced by the NAL units of the track,
    chroma_format_idc shall be equal to sps_chroma_format_idc.
  - Otherwise, if ptl_present_flag is equal to 1, chroma_format_idc
    shall   be   equal   to
    vps_ols_dpb_chroma_format [output_layer_set_idx],   as
    defined in ISO/IEC 23090-3.
  - Otherwise, chroma_format_idc shall not be present.
bit_depth_present_flag equal to 0 specifies that bit_depth_minus8 is not
  present. bit_depth_present_flag equal to 1 specifies that bit_depth_minus8
  is present.
bit_depth_minus8 indicates the bit depth that applies to this track. The following
  constraints apply for bit_depth_minus8:
  - If the value of sps_bitdepth_minus8, as defined in ISO/IEC 23090-3, is the
    same in all SPSs referenced by the NAL units of the track,
    bit_depth_minus8 shall be equal to sps_bitdepth_minus8.
  - Otherwise, if ptl_present_flag is equal to 1, bit_depth_minus8
    shall   be   equal   to
    vps_ols_dpb_bitdepth_minus8 [ output_layer_set_idx], as
    defined in ISO/IEC 23090-3.
  - Otherwise, bit_depth_minus8 shall not be present.
numArrays indicates the number of arrays of NAL units of the indicated type(s).
array_completeness when equal to 1 indicates that all NAL units of the given type are
  in the following array and none are in the stream; when equal to 0 indicates that
  additional NAL units of the indicated type may be in the stream; the default and
  permitted values are constrained by the sample entry name.
NAL_unit_type indicates the type of the NAL units in the following array (which shall be
  all of that type); it takes a value as defined in ISO/IEC 23090-2; it is restricted to take
  one of the values indicating a DCI, VPS, SPS, PPS, APS, prefix SEI, or suffix SEI NAL unit.
numNalus indicates the number of NAL units of the indicated type included in the
  configuration record for the stream to which this configuration record applies. The SEI
  array shall only contain SEI messages of a 'declarative' nature, that is, those that provide
  information about the stream as a whole. An example of such an SEI could be a user-
  data SEI.

TABLE 6-continued nalUnitLength indicates the length in bytes of the NAL unit.
nalUnit contains a DCI, VPS, SPS, PPS, APS or declarative SEI NAL unit, as specified in
 ISO/IEC 23090-3.

For example, referring to Table 6, the syntax elements general_profile_idc, general_tier_flag, general_sub_profile_idc, general_constraint_info, general_level_idc, ptl_frame_only_constraint_flag, ptl_multilayer_enabled_flag, sublayer_level_present and sublayer_level_idc[i] may include matching values of fields for a stream to which the VVC decoder configuration record, defined in ISO/IEC 23090-3, applies general_profile_idc, general_tier_flag, general_sub_profile_idc, bits of general_constraint_info ( ) general_level_idc, ptl_multilayer_enabled_flag, ptl_frame_only_constraint_flag, sublayer_level_present, and sublayer_level_idc[i]. Here, avgFrameRate may provide an average frame rate of a stream to which the VVC decoder configuration record is applied in units of frames/(256 seconds). A value of 0 may indicate an unspecified average frame rate.

Also, for example, referring to Table 6, the syntax element constantFrameRate may indicate a constant frame rate for the VVC decoder configuration record. For example, constantFrameRate equal to 1 may indicate that a stream to which the VVC decoder configuration record is applied is of a constant frame rate. A constantFrameRate equal to 2 may indicate that the representation of each temporal layer of the stream is of a constant frame rate. A constantFrameRate equal to 0 may indicate that the stream may or may not be of a constant frame rate.

Also, for example, referring to Table 6, the syntax element numTemporalLayers may indicate the number of temporal layers included in a track to which the VVC decoder configuration record is applied. For example, numTemporalLayers greater than 1 may indicate that the track to which the VVC decoder configuration record is applied is temporally scalable and the number of the temporal layers (referred to as temporal sublayers or sublayers in ISO/IEC 23090-3) included in the track is equal to numTemporalLayers. numTemporalLayers equal to 1 may indicate that a track to which the VVC decoder configuration record is applied is not temporally scalable. numTemporalLayers equal to 0 may indicate that it is unknown whether a track to which the VVC decoder configuration record is applied is temporally scalable.

Also, for example, referring to Table 6, the syntax element lengthSizeMinusOne plus 1 may indicate the length in bytes of the NALUnitLength field in the VVC video stream sample of the stream to which this configuration record is applied. For example, a size of one byte may be indicated by with a value of 0. The value of length SizeMinusOne may be one of 0, 1, or 3, corresponding to a length encoded as 1, 2, or 4 bytes, respectively.

Also, for example, referring to Table 6, the syntax element ptl_present_flag may indicate that a track includes a VVC bitstream corresponding to a specific output layer set, and thus may indicate whether or not PTL information is included. For example, ptl_present_flag equal to 1 may indicate that the track includes a VVC bitstream corresponding to a specific output layer set (specific OLS). ptl_present_flag equal to 0 may indicate that the track may not include a VVC bitstream corresponding to a specific OLS, but rather may include one or more individual layers that do not form an OLS or individual sublayers excluding the sublayer with TemporalId equal to 0.

Also, for example, referring to Table 6, the syntax element num_sub_profiles may define the number of sub profiles indicated in the VVC decoder configuration record.

Also, for example, referring to Table 6, the syntax element track_ptl may indicate a profile, tier, and level of an OLS indicated by a VVC bitstream included in a track.

Also, for example, referring to Table 6, the syntax element output_layer_set_idx may indicate an output layer set index of an output layer set indicated by a VVC bitstream included in a track. The value of output_layer_set_idx may be used as the value of the TargetOlsIdx variable provided by external means to the VVC decoder, as specified in ISO/IEC 23090-3, to decode the bitstream included in the track.

Also, for example, referring to Table 6, the syntax element chroma_format_present_flag may indicate whether chroma_format_idc is present. For example, chroma_format_present_flag equal to 0 may indicate that chroma_format_idc is not present. chroma_format_present_flag equal to 1 may indicate that chroma_format_idc is present.

Also, for example, referring to Table 6, the syntax element chroma_format_idc may indicate a chroma format applied to the track. For example, the following constraints may be applied to chroma_format_idc.
 If the value of sps_chroma_format_idc defined in ISO/IEC 23090-3 is the same in all SPSs referenced by NAL units of a track, chroma_format_idc shall be equal to sps_chroma_format_idc.
 Otherwise, if ptl_present_flag is equal to 1, chroma_format_idc shall be equal to vps_ols_dpb_chroma_format [output_layer_set_idx] defined in ISO/IEC 23090-3.
 Otherwise (i.e., if the above conditions are not satisfied), chroma_format_idc is not present.

Also, for example, referring to Table 6, the syntax element bit_depth_present_flag may indicate whether bit_depth_minus8 is present. For example, bit_depth_present_flag equal to 0 may indicate that bit_depth_minus8 is not present. bit_depth_present_flag equal to 1 may indicate that bit_depth_minus8 is present.

Also, for example, referring to Table 6, a syntax element bit_depth_minus8 may indicate a bit depth applied to the track. For example, the following constraints may be applied to bit_depth_minus8.
 If the value of sps_bitdepth_minus8 defined in ISO/IEC 23090-3 is the same in all SPSs referred to by NAL units of a track, bit_depth_minus8 shall be equal to sps_bitdepth_minus8.
 Otherwise, if ptl_present_flag is equal to 1, bit_depth_minus8 shall be equal to vps_ols_dpb_bitdepth_minus8 [output_layer_set_idx] defined in ISO/IEC 23090-3.
 Otherwise (i.e., if the above conditions are not satisfied), bit_depth_minus8 is not present.

Also, for example, referring to Table 6, the syntax element numArrays may indicate the number of NAL unit arrays of the indicated type(s).

Also, for example, referring to Table 6, the syntax element array_completeness may indicate whether additional NAL units may be present in the stream. For example, array_completeness equal to 1 may indicate that all NAL units of a given type are in the following array and none are in the stream. Also, for example, array_completeness equal to 0 may indicate that additional NAL units of the indicated type may be in the stream. The default and permitted values may be constrained by the sample entry name.

Also, for example, referring to Table 6, the syntax element NAL_unit_type may indicate the type of NAL units in the following array (which shall be all of that type). NAL_unit_type may have a value defined in ISO/IEC 23090-2. In addition, NAL_unit_type may be restricted to have one of values indicating DCI, VPS, SPS, PPS, APS, prefix SEI or suffix SEI NAL unit.

Also, for example, referring to Table 6, the syntax element numNalus may indicate the number of NAL units of an indicated type included in the VVC decoder configuration record for a stream to which the VVC decoder configuration record is applied. An SEI array may include only SEI messages of a 'declarative' nature, that is, those that provide information on the stream as a whole. An example of such an SEI may be a user-data SEI.

Also, for example, referring to Table 6, the syntax element nalUnitLength may indicate the length in bytes of the NAL unit.

Also, for example, nalUnit may include DCI, VPS, SPS, PPS, APS or declarative SEI NAL unit specified in ISO/IEC 23090-3.

Meanwhile, in order to reconstruct an access unit from samples of multiple tracks carrying a multi-layer VVC bitstream, an operating point may be determined first. For example, when a VVC bitstream is represented by multiple VVC tracks, a file parser may identify the tracks needed for a chosen operating point as follows.

For example, the file parser may find all tracks with VVC sample entries. If the tracks include an 'oref' track reference for the same ID, that ID may be resolved to either a VVC track or an 'opeg' entity group. An operating point may be selected from an 'opeg' entity group or a 'vopi' sample group suitable for decoding capacity and application purposes.

When an 'opeg' entity group is present, it may indicate that a set of tracks exactly represents the selected operating point. Thus, a VVC bitstream may be reconstructed from the set of tracks and decoded.

In addition, when an 'opeg' entity group is not present (i.e., if a 'vopi' sample group is present), it may be discovered from the 'vopi' and 'linf' sample groups which set of tracks is needed for decoding the selected operating point.

In order to reconstruct a bitstream from multiple VVC tracks carrying a VVC bitstream, the target highest value TemporalId may need to be determined first. When a plurality of tracks include data for an access unit, the alignment of respective samples in the tracks may be performed based on the sample decoding times, that is, using the time-to-sample table without considering edit lists.

When a VVC bitstream is represented by multiple VVC tracks, the decoding times of the samples shall be such that if the tracks were combined into a single stream ordered by increasing the decoding time, the access unit order would be correct as specified in ISO/IEC 23090-3. Meanwhile, a sequence of access units may be reconstructed from respective samples in the required tracks according to the implicit restoration process described below. For example, the implicit reconstruction process of a VVC bitstream may be as follows.

For example, when an Operating Points Information sample group is present, a required track may be selected based on a layer and reference layers carrying as indicated in the operating point information and the layer information sample group.

Also, for example, when an operating point entity group is present, a required track may be selected based on information in OperatingPointGroupBox.

In addition, for example, when reconstructing a bitstream including a sublayer for which the VCL NAL units have TemporalId greater than 0, all lower sublayers (i.e., sublayers for which the VCL NAL units have smaller TemporalId) within the same layer are also included in the resulting bitstream, and the required track may be selected accordingly.

In addition, for example, when reconstructing an access unit, picture units (defined in ISO/IEC 23090-3) from samples having the same decoding time may be placed into the access unit in increasing order of nuh_layer_id value.

In addition, for example, when reconstructing an access unit with dependent layers and max_tid_il_ref_pics_plus1 is greater than 0, sublayers of layers for which the VCL NAL units have TemporalId less than or equal to max_tid_il_ref_pics_plus1−1 (indicated in operating point information sample group) within the same layer are also included in the resulting bitstream and the required track may be selected accordingly.

Also, for example, if a VVC track includes a 'subp' track reference, each picture unit may be reconstructed as specified in clause 11.7.3 of ISO/IEC 23090-3 with additional constraints on EOS and EOB NAL units specified below. The process of clause 11.7.3 of ISO/IEC 23090-3 may be repeated for each layer of the target operating point in increasing order of nuh_layer_id. Otherwise, each picture unit may be reconstructed as follows.

Reconstructed access units may be placed into the VVC bitstream in increasing order of decoding time. As described further below, duplicates of end of bitstream (EOB) and end of sequence (EOS) NAL units may be removed from the VVC bitstream.

Also, for example, for access units that are within the same coded video sequence of a VVC bitstream and that belong to different sublayers stored in multiple tracks, there may be one or more tracks including the EOS NAL unit with a particular nuh_layer_id value in the respective samples. In this case, only one of the EOS NAL units may be kept in the last of these access units (the one with the greatest decoding time) in the final reconstructed bitstream, may be placed after all NAL units except for the EOB NAL unit (if present) of the last of these access units, and other EOS NAL units may be discarded. Similarly, there may be one or more tracks including an EOB NAL unit in respective samples. In this case, only one of the EOB NAL units may be kept in the final reconstructed bitstream, may be placed at the end of the last of these access units, and other EOB NAL units may be discarded.

Also, for example, since a specific layer or sublayer may be represented by one or more tracks, when finding out the required track for an operating point, it may have to be selected among the set of tracks that conveys the specific layer or the sublayer altogether.

Further, for example, when the operating point entity group is not present, after selecting among tracks carrying the same layer or sublayer, the final required track may still collectively carry some layers or sublayers that do not belong to the target operation point. A bitstream reconstructed for a target operating point may not include the layers or sublayers that are carried in the final required tracks but do not belong to the target operating point.

Meanwhile, the design of signaling for the above-mentioned operation point may have the following problems.

Specifically, in the above-mentioned OperatingPointGroupBox, for each operation point, information on the number of layers in an Output Layer Set (OLS) related to each operation point, a layer ID, whether a layer is an output layer, etc. may be signaled. Also, the OLS may include information on layer dependency. Here, since signaling for the layer dependency is not required, signaling may be redundant. The information on the layer dependency may help a parser to understand layers included in each OLS, but since information on each operation point already includes information on an OLS index and a layer list included in the OLS, there may be no need to signal information about layer dependency any more.

Also, the advantages of the above-described signaling of all_independent_layers_flag, each_layer_is_an_ols_flag, and ols_mode_idc are not clear. Therefore, it may be better to simply remove the signaling of the above-described syntax elements.

In addition, the OperatingPointGroupBox syntax structure may include signaling for a maximum number of temporal sublayers (i.e., max_tid_il_ref_pics_plus1) for each layer in addition to signaling for layer dependency. Here, since a value of max_tid_il_ref_pics_plus1 for a layer may be different depending on an OLS to which the layer belongs, it may be necessary to organize signaling of the information.

Accordingly, the present disclosure proposes a solution to the above problem. The proposed embodiments may be applied individually or in combinations.

For example, in order to signal information on an operating point, instead of signaling information indicating whether a layer included in the OLS is an output layer a layer list included in the OLS for an output layer set of the operating point (i.e., an OLS designated by an OLS index for the operating point), only a list of layers that are output layers may be signaled. That is, for example, with respect to the OLS for an operating point, instead of signaling a layer list included in the existing OLS and information indicating whether a layer included in the OLS is an output layer, a method of signaling an in-layer list which is an output layer included in the OLS may be proposed. A complete list of layers required for the OLS may be derived based on a list of layers that are output layers and layer dependency information. Through the method of this embodiment, the amount of bits can be reduced and the coding efficiency can be improved compared to signaling for existing OLS. Here, the derivation of the entire list may be the same as the derivation process specified in the VVC specification.

Also, as an example, signaling of all_independent_layers_ flag, each_layer_is_an_ols_flag, and ols_mode_idc may be deleted. That is, for example, a method of not signaling all_independent_layers_flag, each_layer_is_an_ols_flag, and ols_mode_idc in VvcOperatingPointsRecord may be proposed.

Also, as an example, signaling of information on layer dependency may be moved to a position prior to signaling of an operation point list. That is, for example, a method of signaling information about layer dependency before information about an operation point list may be proposed.

Also, as an example, for each OLS, a method of signaling an entire list of layers included in the OLS may be proposed. Through the method of this embodiment, it may not be necessary to signal information about layer dependency.

Also, as an example, a flag indicating whether information on a maximum temporal sublayer required for inter-layer prediction for each layer of the OLS exists may be signaled. That is, for example, a method of signaling a flag indicating whether information on a maximum temporal sublayer required for inter-layer prediction for each layer of the OLS exists may be proposed.

a) For example, the flag proposed in this embodiment may be called max_tid_il_present_flag.

b) Further, for example, when the max_tid_il_present_ flag is 1, information on a maximum temporal sublayer required for inter-layer prediction (i.e., max_tid_il_ ref_pics_plus1) may exist for each layer other than an output layer in the OLS. That is, when the max_tid_il_ present_flag is 1, information on the maximum temporal sublayer for a layer other than the output layer in the OLS (i.e., max_tid_il_ref_pics_plus1) may be signaled.

Also, as an example, the signaling proposed in the above-described embodiment(s) may be applied to both signaling of information on operating points in VvcOperatingPointsRecord and OperatingPointGroupBox. That is, for example, a method of applying information signaling proposed in the above-described embodiment(s) to both VvcOperatingPointsRecord and information on operating points in OperatingPointGroupBox may be proposed.

For example, as an embodiment proposed in the present disclosure, a VvcOperatingPointsRecord, that is, an operating point information sample group configured as shown in the following table may be proposed.

TABLE 7

```
class VvcOperatingPointsRecord {
    unsigned int (8) num_profile_tier_level_minus1;
    for (i=0; i<=num_profile_tier_level_minus1; i++) {
        unsigned int (8) ptl_max_temporal_id[i];
        VvcPTLRecord (ptl_max_temporal_id[i]+1) ptl[i];
    }
    unsigned int (8) max_layer_count;
    for (i=0; i<max_layer_count; i++) {
        unsigned int (8) layerID;
        unsigned int (8) num_direct_ref_layers;
        for (j=0; j<num_direct_ref_layers; j++)
            unsigned int (8) direct_ref_layerID;
        unsigned int (8) max_tid_il_ref_pics_plus1;
    }
    unsigned int (16) num_operating_points;
    for (i=0; i<num_operating_points) {
        unsigned int (16) output_layer_set_idx;
        unsigned int (8) ptl_idx;
        unsigned int (8) max_temporal_id;
        unsigned int (8) output_layer_count;
        for (j=0; j<output_layer_count; j++) {
            unsigned int (6) layer_id;
            bit (2) reserved = 0;
        }
        bit (6) reserved = 0;
        unsigned int (1) frame_rate_info_flag
        unsigned int (1) bit_rate_info_flag
        if (frame_rate_info_flag) {
            unsigned int (16) avgFrameRate;
            bit (6) reserved = 0;
            unsigned int (2) constantFrameRate;
        }
        if (bit_rate_info_flag) {
            unsigned int (32) maxBitRate;
            unsigned int (32) avgBitRate;
        }
    }
}
```

Referring to Table 7 described above, all_independent_ layers_flag, each_layer_is_an_ols_flag, and ols_mode_idc may not be signaled in the operation point information sample group. That is, the operation point information sample group may not include all_independent_layers_flag, each_layer_is_an_ols_flag, and ols_mode_idc. Also, referring to Table 7 described above, signaling of information on layer dependency may be moved to a position prior to signaling of an operation point list. That is, for example, information on layer dependency in the operation point information sample group may be signaled prior to information on the operation point list. Specifically, for example, syntax elements max_layer_count, layerID, num_direct_ref_layers, direct_ref_layerID and/or max_tid_il_ ref_pics_plus1 in the operating point information sample group may be signaled/parsed before syntax elements num_ operating_points, output_layer_set_idx, ptl_idx and/or max_ temporal_id.

In addition, referring to Table 7 described above, instead of signaling a layer list included in the existing OLS and information indicating whether a layer included in the OLS is an output layer, only a list of a layer which is an output layer in the OLS for an operation point may be signaled. Specifically, for example, in the operation point information sample group, the existing syntax element layer_count may not be signaled/parsed, the syntax element output_layer_count may be signaled/parsed, and the syntax element is_outputlayer may not be signaled/parsed. The syntax element output_layer_count may represent the number of OLS output layers having the same Id as output_layer_set_idx of an operation point.

Semantics of the syntax elements output_layer_count and layer_id of the operating point information sample group proposed in this embodiment may be as shown in the following table.

TABLE 8 output_layer_count: This field indicates the number of output layers in the output layer set
  with Id equal to output_layer_set_idx, as defined ISO/IEC 23090-3, of this operating point.
layer_id: provides the nuh_layer_id values for the output layers in the output layer set with Id
  equal to output_layer_set_idx associated with the operating point.

For example, referring to Table 8 described above, the syntax element output_layer_count may indicate the number of output layers of the OLS having the same Id as output_layer_set_idx of an operation point, as defined in ISO/IEC 23090-3.

Also, for example, referring to Table 8 described above, the syntax element layer_id may provide a nuh_layer_id value for an output layer of the OLS having the same Id as output_layer_set_idx associated with an operation point.

In addition, for example, as another embodiment proposed in the present disclosure, VvcOperatingPointsRecord configured as shown in the following table, that is, an operating point information sample group may be proposed.

TABLE 9

```
class VvcOperatingPointsRecord {
    unsigned int (8) num_profile_tier_level_minus1;
    for (i=0; i<=num_profile_tier_level_minus1; i++) {
        unsigned int (8) ptl_max_temporal_id[i];
        VvcPTLRecord (ptl_max_temporal_id[i]+1) ptl[i];
    }
    unsigned int (1) all_independent_layers_flag;
    bit (7) reserved = 0;
    if (all_independent_layers_flag) {
        unsigned int (1) each_layer_is_an_ols_flag;
        bit (7) reserved = 0;
    } else
        unsigned int (8) ols_mode_idc;
    unsigned int (12) num_operating_points;
    unsigned int (1) max_tid_il_present_flag;
    bit (3) reserved = -;
    for (i=0; i<num_operating points) {
        unsigned int (16) output_layer_set_idx;
```

TABLE 9-continued

```
        unsigned int (8) ptl_idx;
        unsigned int (8) max_temporal_id;
        unsigned int (8) layer_count;
        for (j=0; j<layer_count; j++) {
            unsigned int (6) layer_id;
            unsigned int (1) is outputlayer;
            bit (1) reserved = 0;
            if (!is_outputlayer && max_tid_il_present_flag)
                unsigned int (8) max_tid_il_ref_pics_plus1
        }
        bit (6) reserved = 0;
        unsigned int (1) frame_rate_info_flag
        unsigned int (1) bit_rate_info_flag
        if (frame_rate_info_flag) {
            unsigned int (16) avgFrameRate;
            bit (6) reserved = 0;
            unsigned int (2) constantFrameRate;
        }
        if (bit_rate_info_flag) {
            unsigned int (32) maxBitRate;
            unsigned int (32) avgBitRate;
        }
    }
}
```

Referring to Table 9 described above, the operation point information sample group may include max_tid_il_present_flag. That is, for example, max_tid_il_present_flag may be signaled/parsed in the operation point information sample group. Here, max_tid_il_present_flag may be a flag indicating whether information on a maximum temporal sublayer required for inter-layer prediction exists for each layer of the OLS, as described above. That is, for example, max_tid_il_present_flag may indicate whether max_tid_il_ref_pics_plus1 for the corresponding layer exists.

In addition, referring to Table 9 described above, when a target layer is not an output layer (i.e., a value of is_outputlayer for the target layer is 0) and a value of max_tid_il_present_flag for the target layer is 1, max_tid_il_ref_pics_plus1 may be signaled/parsed in an operation point information sample group. For example, as described above, max_tid_il_ref_pics_plus1 may indicate a maximum number of temporal sublayers that can be used for inter-layer prediction for decoding pictures of other layers in the target layer. For example, a value obtained by subtracting 1 from max_tid_il_ref_pics_plus1 may indicate the maximum number of temporal sublayers that can be used for inter-layer prediction in the target layer.

Semantics of the syntax elements max_tid_il_present_flag and max_tid_il_ref_pics_plus1 of the operating point information sample group proposed in this embodiment may be as shown in the following table.

TABLE 10 max_tid_il_present_flag equal to 1 specifies syntax element
    max_tid_il_ref_pics_plus1 may be present. max_tid_il_present_flag equal to 0 specifies that
    syntax element max_tid_il ref pics_plus1 is not present.
max_tid_il_ref_pics_plus1 equal to 0 specifies that the pictures of the layer with
    layer Id equal to layer_id that are neither IRAP pictures nor GDR pictures with
    ph_recovery_poc_cnt equal to 0 are not used as ILRPs for decoding of pictures of other
    layers in the output layer set. max_tid_il_ref_pics plus1 greater than 0 specifies that, for
    decoding pictures of the in other layers of the output layer set, no picture from the layer with
    layer Id equal to layer_id with TemporalId greater than max_tid_il_ref_pics_plus1 − 1 is
    used as ILRP and no APS with nuh_layer_id equal to layer_id and TemporalId greater than
    max_tid_il_ref_pics_plus1 − 1 is referenced. When not present, the value of
    max tid il ref pics plus1 is inferred to be equal to max_temporal_id.

For example, referring to Table 10 described above, the syntax element max_tid_il_present_flag may indicate whether the syntax element max_tid_il_ref_pics_plus1 exists. For example, max_tid_il_present_flag equal to 1 may indicate that the syntax element max_tid_il_ref_pics_plus1 may exist. Also, for example, max_tid_il_present_flag equal to 0 may indicate that the syntax element max_tid_il_ref_pics_plus1 does not exist.

Also, for example, referring to Table 10 described above, the syntax element max_tid_il_ref_pics_plus1 may indicate a maximum number of temporal sublayers that may be used for inter-layer prediction of pictures of other layers within a target layer. For example, max_tid_il_ref_pics_plus1 being equal to 0 may represent that a picture, which is not an IRAP picture and a GDR (Gradual Decoding Refresh) picture having ph_recovery_poc_cnt equal to 0, of a layer having a layer ID equal to layer_id is not used as an inter-layer reference picture (ILRP) for decoding a picture of other layer in the OLS. In addition, for example, max_tid_il_ref_pics_plus1 greater than 0 may represent that a picture of a layer having TemporalId greater than max_tid_il_ref_pics_plus1-1 (i.e., max_tid_il_ref_pics_plus1 minus 1) are not used as ILRP for decoding a picture in in other layers of OLS, and an APS with nuh_layer_id equal to layer_id and TemporalId greater than max_tid_il_ref_pics_plus1−1 (i.e., a value obtained by subtracting 1 from max_tid_il_ref_pics_plus1) is not referenced. Meanwhile, when max_tid_il_ref_pics_plus1 does not exist, the value of max_tid_il_ref_pics_plus1 may be considered equal to max_temporal_id.

Figure 4:
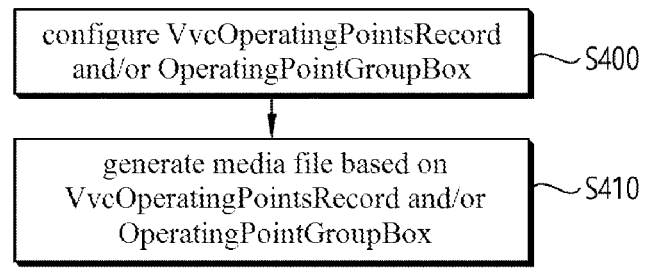
FIG. 4 exemplarily illustrates a method of generating a media file to which an embodiment proposed in the present disclosure is applied.

FIG. 4 exemplarily illustrates a method of generating a media file to which an embodiment proposed in the present disclosure is applied.

Referring to FIG. 4, a first device may configure VvcOperatingPointsRecord (an operating point information sample group) and/or OperatingPointGroupBox (an operating point entity group) (S400). For example, the first device may represent a transmission end, an encoding end, or a media file generating end. For example, the first device may obtain encoded image/video information through a network or a (digital) storage medium. Here, the network may include a broadcasting network and/or a communication network, and the digital storage medium may include various storage media such as USB, SD, CD, DVD, Blu-ray, HDD, SSD, etc. In addition, the first device may include an encoder and derive the encoded image/video information. Then, the first device may configure VvcOperatingPointsRecord (an operating point information sample group) and/or OperatingPointGroupBox (an operating point entity group). For example, the first device may configure VvcOperatingPointsRecord and/or OperatingPointGroupBox for the encoded image/video information according to the above-described embodiment.

After, the first device may generate a media file based on the VvcOperatingPointsRecord and/or OperatingPointGroupBox (S410).

Figure 5:
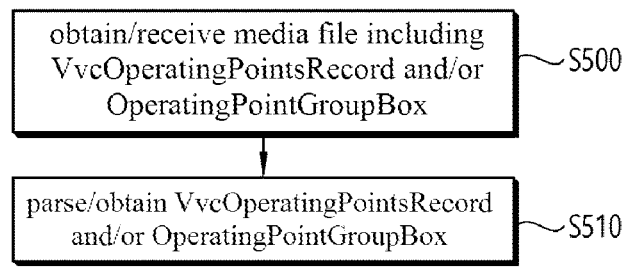
FIG. 5 exemplarily illustrates a method of decoding a media file generated by applying an embodiment proposed in the present disclosure.

FIG. 5 exemplarily illustrates a method of decoding a media file generated by applying an embodiment proposed in the present disclosure.

A second device may obtain/receive a media file including VvcOperatingPointsRecord and/or OperatingPointGroupBox (S500). For example, the second device may represent a reception end, a decoding end, or a rendering end.

For example, a media file may include information described in Table 1, Table 3, Table 7, and/or Table 9. For example, the VvcOperatingPointsRecord and/or OperatingPointGroupBox may include information/fields of the embodiment(s) proposed in the present disclosure.

The second device may parse/acquire the VvcOperatingPointsRecord and/or OperatingPointGroupBox (S510). The second device may parse/obtain the VvcOperatingPointsRecord and/or OperatingPointGroupBox included in the media file. For example, the VvcOperatingPointsRecord and/or OperatingPointGroupBox may include operating point-related information (or OLS-related information), and the second device may derive an operating point (or OLS) based on the VvcOperatingPointsRecord and/or OperatingPointGroupBox. Based on the derived operation point (or OLS), image/video decoding and/or (decoded) picture output may be performed.

Figure 6:
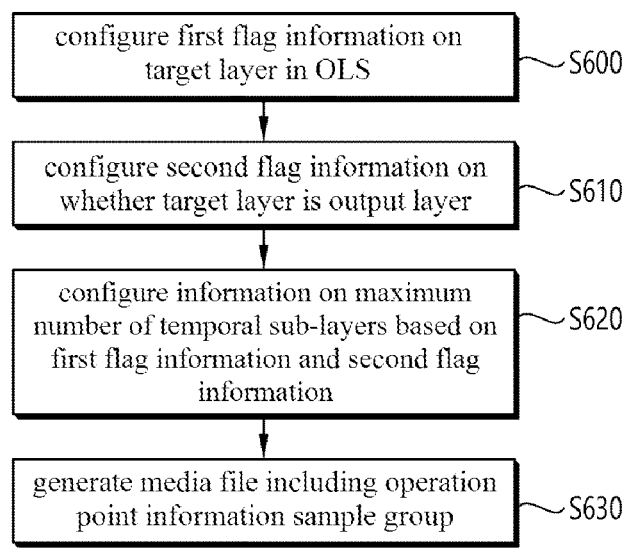
FIG. 6 briefly illustrates a method of generating a media file according to another embodiment of the present disclosure.

FIG. 6 briefly illustrates a method of generating a media file according to another embodiment of the present disclosure. The method disclosed in FIG. 6 may be performed by a media file generating device disclosed in FIG. 7. The media file generating device may represent the above-described first device. Specifically, for example, S600 to S620 of FIG. 6 may be performed by an image processing unit of the media file generating device, and S630 may be performed by a media file generating unit of the media file generating device. Also, although not shown, a process of encoding a bitstream including image information may be performed by an encoder of the media file generating device.

The media file generating device configures first flag information for a target layer in an Output Layer Set (OLS) (S600). The first flag information may indicate whether information on a maximum number of temporal sublayers for inter-layer prediction exists.

For example, the media file generating apparatus may derive encoded image information, configure an operation point information sample group for a bitstream including the encoded image information, and generate a media file including the operation point information sample groups. For example, the media file generating apparatus may derive encoded image information, determine whether there is information on the maximum number of temporal sublayers for inter-layer prediction in relation to the target layer based on the encoded image information, and construct the first flag information for the target layer based on a result of the determination. That is, for example, the media file generating device may determine whether a temporal sublayer that can be used for inter-layer prediction of pictures of other layers exists in the target layer, and construct the first flag information indicating whether the information on the maximum number of temporal sublayers for inter-layer prediction exists based on the result of the determination. Meanwhile, for example, the media file generating device may obtain the encoded image information through a network or a (digital) storage medium. Here, the network may include a broadcasting network and/or a communication network, and the digital storage medium may include various storage media such as USB, SD, CD, DVD, Blu-ray, HDD, SSD and etc. Alternatively, for example, the media file generating device may include an encoder and derive the encoded image information.

For example, the syntax element of the first flag information may be the aforementioned max_tid_il_present_flag. For example, the first flag information being equal to 1 may indicate that the information on the maximum number of the temporal sublayers may exist. Also, for example, the first flag information being equal to 0 may indicate that the information about the maximum number of the temporal sublayers does not exist.

The media file generating device configures second flag information on whether the target layer is an output layer (S610). For example, the media file generating device may derive encoded image information, determine whether the target layer is an output layer based on the encoded image information, and determine whether the target layer is an output layer based on the result of the determination. The second flag information regarding whether a layer is an output layer may be configured.

For example, the syntax element of the second flag information may be the aforementioned is_outputlayer. For example, the second flag information being equal to 1 may indicate that the target layer is an output layer. Also, for example, the second flag information being equal to 0 may indicate that the target layer is not the output layer.

The media file generating device configures the information on the maximum number of the temporal sub-layers based on the first flag information and the second flag information (S620). The media file generating device may configure the information on the maximum number of temporal sub-layers based on the first flag information and the second flag information. For example, when the first flag information indicates that the information on the maximum number of temporal sublayers can exist and the second flag information indicates that the target layer is not the output layer, the media file generating device may configure the information on the maximum number of the temporal sub-layers in the operation point information sample group. When the first flag information indicates that the information on the maximum number of the temporal sub-layers does not exist or when the second flag information indicates that the target layer is the output layer, the media file generating device may not configure the information on the maximum number of the temporal sublayers in the operation point information sample group. That is, for example, when the value of the first flag information is 1 and the value of the second flag information is 0, the media file generating device assigns the maximum number of temporal sublayers to the operation point information sample group. When the value of the first flag information is 0 or the value of the second flag information is 1, the media file generating device may not configure the information on the maximum number of the temporal sublayers in the operation point information sample group.

For example, the information on the maximum number of the temporal sublayers may be configured in the operation point information sample group based on the first flag information equal to 1 and the second flag information equal to 0. That is, for example, when the value of the first flag information is 1 and the value of the second flag information is 0, the information on the maximum number of the temporal sublayers may be configured in the operation point information sample group. Also, for example, the information on the maximum number of the temporal sublayers may not be configured in the operation point information sample group based on the first flag information equal to 0 and/or the second flag information equal to 1. That is, for example, when the value of the first flag information is 0 or the value of the second flag information is 1, the information on the maximum number of temporal sublayers may not be configured in the operation point information sample group.

For example, the syntax element of the information on the maximum number of the temporal sublayers may be the aforementioned max_tid_il_ref_pics_plus1. For example, a value obtained by subtracting 1 from a value of the information about the maximum number of the temporal sublayers may be derived as the maximum number of the temporal sublayers.

Specifically, for example, the information on the maximum number of temporal sublayers may indicate the maximum number of temporal sublayers required for inter-layer prediction of a picture of other layer in a target layer. For example, a value obtained by subtracting 1 from a value of the information about the maximum number of temporal sublayers may represent the maximum number of temporal sublayers required for inter-layer prediction in the target layer. In addition, for example, the information on the maximum number of the temporal sublayers equal to 0 may indicate that a picture, which is not an IRAP (Intra Random Access Point) picture and a GDR (Gradual Decoding Refresh) picture having ph_recovery_poc_cnt equal to 0, of a target layer is not used as an inter-layer reference picture (ILRP) for decoding a picture of other layer in the OLS. Here, ILRP may indicate a reference picture used for inter-layer prediction. In addition, for example, the information about the maximum number of the temporal sublayers greater than 0 may represent that a picture of the target layer with a TemporalId greater than a value subtracted 1 from the value of the information about the maximum number of temporal sublayers is not used as an ILRP, and APS in which nuh_layer_id is equal to layer_id and TemporalId is greater than the value subtracted 1 from the value of the information about the maximum number of temporal sublayers is not referenced. Meanwhile, when the information on the maximum number of the temporal sub-layers does not exist, the value of the information on the maximum number of the temporal sub-layers may be considered equal to max_temporal_id.

The media file generating device generates a media file including an operation point information sample group (S630). The media file generating device may generate a media file including an operation point information sample group. Meanwhile, for example, the operating point information sample group may be called VvcOperatingPointsRecord.

For example, the operation point information sample group may include the first flag information and the second flag information. Also, for example, the information on the maximum number of the temporal sublayers may be configured in the operation point information sample group based on the first flag information being equal to 1 and the second flag information being equal to 0. That is, for example, when the value of the first flag information is 1 and the value of the second flag information is 0, the information on the maximum number of the temporal sublayers may be configured in the operation point information sample group.

Meanwhile, for example, the operating point information sample group may include information on layer dependency and information on a list of operating points. For example, the information about the layer dependency in the operation point information sample group may be signaled prior to the information about the list of operation points. That is, for example, the information on the layer dependency and the information on the list of the operation points may be configured in the operation point information sample group, and the information on the layer dependency in the operation point information sample group may be configured prior to the information on the list of operation points.

For example, the information on the layer dependency may include information indicating the number of all (unique) layers of all operation points, layer ID information, information on the number of direct reference layers, and/or direct reference layer ID information. The syntax element of the information indicating the number of the layers of the operating points may be the above-described max_layer_count, the syntax element of the layer ID information may be layerID, the syntax element of the information on the number of direct reference layers may be the above-described num_direct_ref_layers, and the syntax element of ID information of the direct reference layer may be the above-described direct_ref_layerID.

Further, for example, the information on the list of the operation points may include information on the number of the operation points, OLS index information on the operation points, PTL structure index information on the OLS, and/or maximum temporal ID information. For example, the information on the number of operating points may indicate the number of operating points, the OLS index information may indicate OLSs for the operating points, the PTL structure index information may indicate the PTL structure for the OLS, and the maximum temporal ID information may indicate a maximum temporal ID (TemporalId) of a NAL unit of operation points. The syntax element of the information on the number of operating points may be the above-mentioned num_operating_points, the syntax element of the OLS index may be output_layer_set_idx, the syntax element of the PTL structure index information may be the above-mentioned ptl_idx, and the syntax element of the maximum temporal ID information may be the above-mentioned max_temporal_id.

Alternatively, for example, the operation point information sample group may include information about a list of output layers in the OLS, and may not include information about a list of layers other than an output layer in the OLS. That is, for example, information about a list of output layers in the OLS may be configured/included in the operation point information sample group, and information about a list of layers other than an output layer in the OLS may not be configured/included. In this case, the above-described second flag information may not be configured/included in the operation point information sample group. For example, the information on the list of output layers may include information on the number of output layers and/or layer ID information. For example, the information on the number of output layers may indicate the number of output layers in the OLS, and the layer ID information may indicate a layer ID of a layer of the layer ID information. A syntax element of the information on the number of output layers may be the above-described output_layer_count, and a syntax element of the layer ID information may be the above-described layer_id.

Alternatively, for example, the operation point information sample group may include information on a complete list of layers in the OLS and may not include information on layer dependency. That is, for example, information on the complete list of layers in the OLS may be configured/included in the operation point information sample group, and information on layer dependency may not be configured/included.

Alternatively, for example, the operation point information sample group may not include flag information on whether all layers are independently coded without using inter-layer prediction, flag information on whether each OLS (Output Layer Set) includes only one output layer and/or OLS mode index information indicating a mode of each OLS. That is, for example, flag information on whether all layers are independently coded without using inter-layer prediction, flag information on whether each OLS (Output Layer Set) includes only one output layer and/or OLS mode index information indicating a mode of each OLS may be configured/not included in the operation point information sample group. For example, the syntax element of the flag information on whether all the layers are independently coded without using inter-layer prediction may be the above-described all_independent_layers_flag, and the syntax element of the flag information on whether each OLS (Output Layer Set) includes only one output layer may be each_layer_is_an_ols_flag, and the syntax element of the OLS mode index information indicating the mode of each OLS may be ols_mode_idc.

Meanwhile, although not shown, the media file generating device may store the generated media file in a (digital) storage medium or transmit the generated media file to a media file processing device through a network or a (digital) storage medium. Here, the network may include a broadcasting network and/or a communication network, and the digital storage medium may include various storage media such as USB, SD, CD, DVD, Blu-ray, HDD, SSD and etc.

Figure 7:
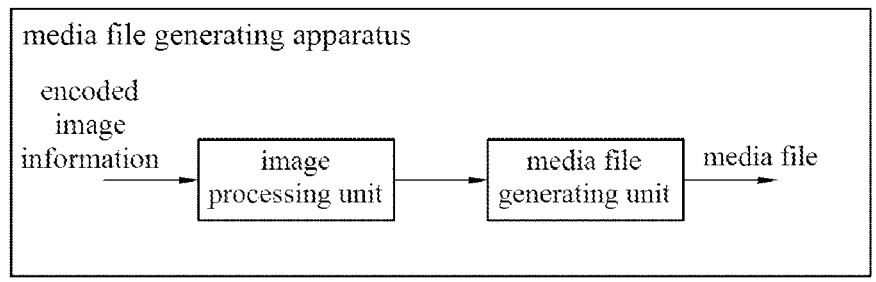
FIG. 7 briefly illustrates a media file generating apparatus according to the present disclosure.

FIG. 7 briefly illustrates a media file generating apparatus according to the present disclosure. The method disclosed in FIG. 6 may be performed by the media file generating device disclosed in FIG. 7. Specifically, for example, the image processing unit of the media file generating device of FIG. 7 may perform S600 to S620, and the media file generating unit of the media file generating device of FIG. 7 may perform S630. Also, although not shown, a process of encoding a bitstream including image information may be performed by an encoder of the media file generating device.

Figure 8:
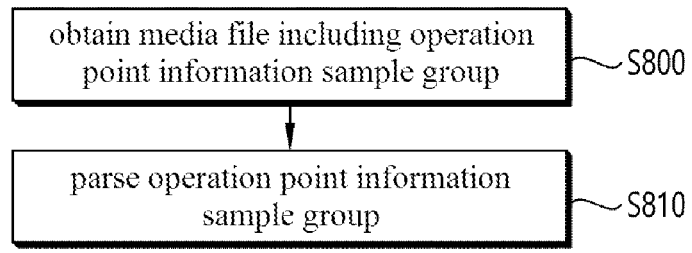
FIG. 8 briefly illustrates a method of processing a media file according to an embodiment of the present disclosure.

FIG. 8 briefly illustrates a method of processing a media file according to an embodiment of the present disclosure. The method disclosed in FIG. 8 may be performed by the media file processing device disclosed in FIG. 9. The media file processing device may represent the aforementioned second device. Specifically, for example, S800 of FIG. 8 may be performed by the receiving unit of the media file processing device, and S810 may be performed by the media file processing unit of the media file processing device. Also, although not shown, a process of decoding a bitstream based on a decoder configuration record may be performed by the decoder of the media file processing device.

The media file processing device obtains a media file including an operation point information sample group (S800). For example, the media file processing device may obtain the media file including the operation point information sample group through a network or a (digital) storage medium. Here, the network may include a broadcasting network and/or a communication network, and the digital storage medium may include various storage media such as USB, SD, CD, DVD, Blu-ray, HDD, SSD and etc.

The media file processing device parses the operation point information sample group (S810). For example, the media file processing device may parse/derive the operation point information sample group.

Specifically, for example, the media file processing apparatus may parse first flag information for a target layer within an Output Layer Set (OLS). That is, the media file processing device may parse the first flag information included in the operation point information sample group. The first flag information may indicate whether information on a maximum number of temporal sublayers for inter-layer prediction presents.

For example, the syntax element of the first flag information may be the aforementioned max_tid_il_present_flag. For example, the first flag information being equal to 1 may indicate that the information on the maximum number of the temporal sublayers may be present. Also, for example, the first flag information being equal to 0 may indicate that the information about the maximum number of the temporal sublayers is not present.

Also, for example, the media file processing apparatus may parse second flag information about whether the target layer is an output layer. That is, the media file processing device may parse the second flag information included in the operation point information sample group. The second flag information may indicate whether the target layer is the output layer.

For example, a syntax element of the second flag information may be the aforementioned is_outputlayer. For example, the second flag information being equal to 1 may indicate that the target layer is the output layer. Also, for example, the second flag information being equal to 0 may indicate that the target layer is not the output layer.

Also, for example, the media file processing apparatus may parse the information on the maximum number of the temporal sublayers based on the first flag information and the second flag information.

For example, when the first flag information indicates that the information on the maximum number of temporal sublayers may present and the second flag information indicates that the target layer is not the output layer, the media file processing device may parse the information about the maximum number of the temporal sublayers in the operation point information sample group. And, when the first flag information indicates that the information on the maximum number of temporal sub-layers is not present or the second flag information indicates that the target layer is the output layer, the media file processing device may not parse the information on the maximum number of temporal sublayers in the operation point information sample group. That is, for example, when a value of the first flag information is 1 and a value of the second flag information is 0, the media file processing device may parse the information on the maximum number of temporal sublayers in the operation point information sample group. And, when the value of the first flag information is 0 or the value of the second flag information is 1, the media file processing device may not parse the information about the maximum number of the temporal sublayers in the operation point information sample group.

For example, the information on the maximum number of the temporal sublayers may be configured/included in the operation point information sample group based on the first flag information being equal to 1 and the second flag information being equal to 0. That is, for example, when the value of the first flag information is 1 and the value of the second flag information is 0, the information on the maximum number of temporal sublayers may be configured/included in the operation point information sample group. Further, for example, the information on the maximum number of the temporal sublayers may not be configured/included in the operation point information sample group based on the first flag information being equal to 0 and/or the second flag information being equal to 1. That is, for example, when the value of the first flag information is 0 or the value of the second flag information is 1, the information on the maximum number of temporal sublayers may not be configured/included in the operation point information sample group.

For example, the syntax element of the information for the maximum number of the temporal sublayers may be the aforementioned max_tid_il_ref_pics_plus1. For example, a value obtained by subtracting 1 from a value of the information about the maximum number of the temporal sublayers may be derived as the maximum number of the temporal sublayers.

Specifically, for example, the information on the maximum number of temporal sublayers may indicate the maximum number of temporal sublayers required for inter-layer prediction of a picture of other layer in a target layer. For example, a value obtained by subtracting 1 from a value of the information about the maximum number of temporal sublayers may represent the maximum number of temporal sublayers required for inter-layer prediction in the target layer. In addition, for example, the information on the maximum number of the temporal sublayers being equal to 0 may represent that a picture, which is not an IRAP (Intra Random Access Point) picture nor a GDR (Gradual Decoding Refresh) picture having ph_recovery_poc_cnt equal to 0, of the target layer is not used as an inter-layer reference picture (ILRP) for decoding pictures of other layers in the OLS. Here, ILRP may indicate a reference picture used for inter-layer prediction. In addition, for example, the information about the maximum number of the temporal sublayers greater than 0 may represent that a picture of the target layer with a TemporalId greater than a value subtracted 1 from the value of the information about the maximum number of temporal sublayers is not used as an ILRP, and APS in which nuh_layer_id is equal to layer_id and TemporalId is greater than the value subtracted 1 from the value of the information about the maximum number of temporal sublayers is not referenced. Meanwhile, when the information on the maximum number of the temporal sub-layers does not exist, the value of the information on the maximum number of the temporal sub-layers may be considered equal to max_temporal_id.

Meanwhile, for example, the operating point information sample group may include information on layer dependency and information on a list of operating points. For example, the information about the layer dependency in the operation point information sample group may be signaled/parsed prior to the information about the list of operation points. That is, for example, the information on the layer dependency and the information on the list of the operation points may be configured/included in the operation point information sample group, and the information about the layer dependency in the operation point information sample group may be configured/included prior to the information about the list of operation points.

For example, the information about the layer dependency may include information indicating the number of all (unique) layers of all operation points, layer ID information, information about the number of direct reference layers, and/or direct reference layer ID information. The syntax element of the information indicating the number of the layers of the operating points may be the above-described max_layer_count, the syntax element of the layer ID information may be layerID, the syntax element of the information on the number of direct reference layers may be the above-described num_direct_ref_layers, and the syntax element of the direct reference ID information may be the above-described direct_ref_layerID.

Further, for example, the information about the list of operation points may include information about the number of operation points, OLS index information about the operation points, PTL structure index information about OLS, and/or maximum temporal ID information. For example, the information on the number of operating points may indicate the number of operating points, the OLS index information may indicate OLSs for the operating points, and the PTL structure index information may indicate the PTL structure of operating points, and the maximum temporal ID information may indicate a maximum temporal ID (TemporalId) of a NAL unit of operation points. The syntax element of the information on the number of operating points may be the above-mentioned num_operating_points, the syntax element of the OLS index may be output_layer_set_idx, the syntax element of the PTL structure index information may be the above-mentioned ptl_idx, and the syntax element of the maximum temporal ID information may be the above-mentioned max_temporal_id.

Alternatively, for example, the operation point information sample group may include information about a list of output layers in the OLS, and may not include information about a list of layers other than an output layer in the OLS. That is, for example, information about a list of output layers in the OLS may be configured/included in the operation point information sample group, and information about a list of layers other than an output layer in the OLS may not be configured/included. In this case, the above-described second flag information may not be configured/included in the operation point information sample group. For example, the information on the list of output layers may include information on the number of output layers and/or layer ID information. For example, the information on the number of output layers may indicate the number of output layers in the OLS, and the layer ID information may indicate a layer ID of a layer of the layer ID information. A syntax element of the information on the number of output layers may be the above-described output_layer_count, and a syntax element of the layer ID information may be the above-described layer_id.

Alternatively, for example, the operation point information sample group may include information on a complete list of layers in the OLS and may not include information on layer dependency. That is, for example, information on the entire list of layers in the OLS may be configured/included in the operation point information sample group, and information on layer dependency may not be configured/included.

Alternatively, for example, the operation point information sample group may not include flag information on whether all layers are independently coded without using inter-layer prediction, flag information on whether each OLS (Output Layer Set) includes only one output layer and/or OLS mode index information indicating a mode of each OLS. That is, for example, flag information on whether all layers are independently coded without using inter-layer prediction, flag information on whether each OLS (Output Layer Set) includes only one output layer and/or OLS mode index information indicating a mode of each OLS may be configured/not included in the operation point information sample group. For example, the syntax element of the flag information on whether all the layers are independently coded without using inter-layer prediction may be the above-described all_independent_layers_flag, and the syntax element of the flag information on whether each OLS (Output Layer Set) includes only one output layer may be each_layer_is_an_ols_flag, and the syntax element of the OLS mode index information indicating the mode of each OLS may be ols_mode_idc.

Meanwhile, although not shown, the media file processing apparatus may decode a bitstream based on the decoder configuration record. For example, the media file processing apparatus may decode image information in a bitstream for the operation point information sample group based on information included in the operation point information sample group, and generate a reconstructed picture based on the image information.

Figure 9:
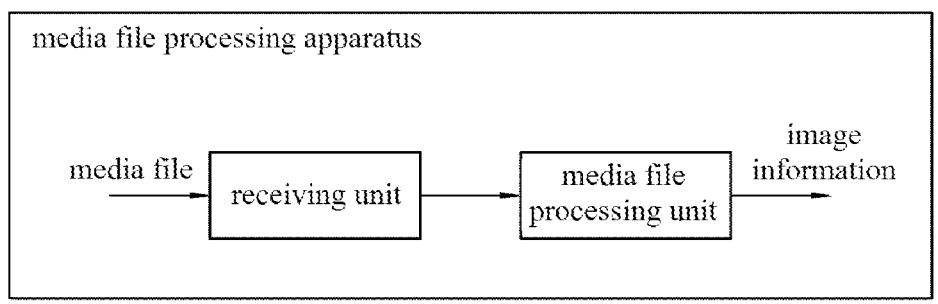
FIG. 9 briefly illustrates a method of processing a media file according to another embodiment of the present disclosure.

FIG. 9 schematically shows a media file processing device that performs a media file processing method according to present disclosure. The method disclosed in FIG. 8 may be performed by the media file processing apparatus disclosed in FIG. 9. Specifically, for example, the receiving unit of the media file processing apparatus of FIG. 9 may perform S800 of FIG. 8, and the media file processing unit of the media file processing apparatus of FIG. 9 may perform S810 of FIG. 8. Meanwhile, although not shown, the media file processing device may include a decoder, and the decoder may decode a bitstream based on the operation point information sample group.

According to the present disclosure above, since the value of information indicating the maximum number of temporal layers for intra-layer prediction may vary depending on the OLS to which the layer belongs, whether to signal the information may be determined in consideration of flag information indicating whether the information is signaled and whether the layer is an output layer, and through this, signaling redundancy for media file delivery may be reduced and overall coding efficiency may be improved.

In addition, according to the present disclosure, signaling of layer dependency information can be performed in the same manner as proposed in various embodiments, thereby signaling redundancy for media file delivery can be reduced and overall coding efficiency can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 10:
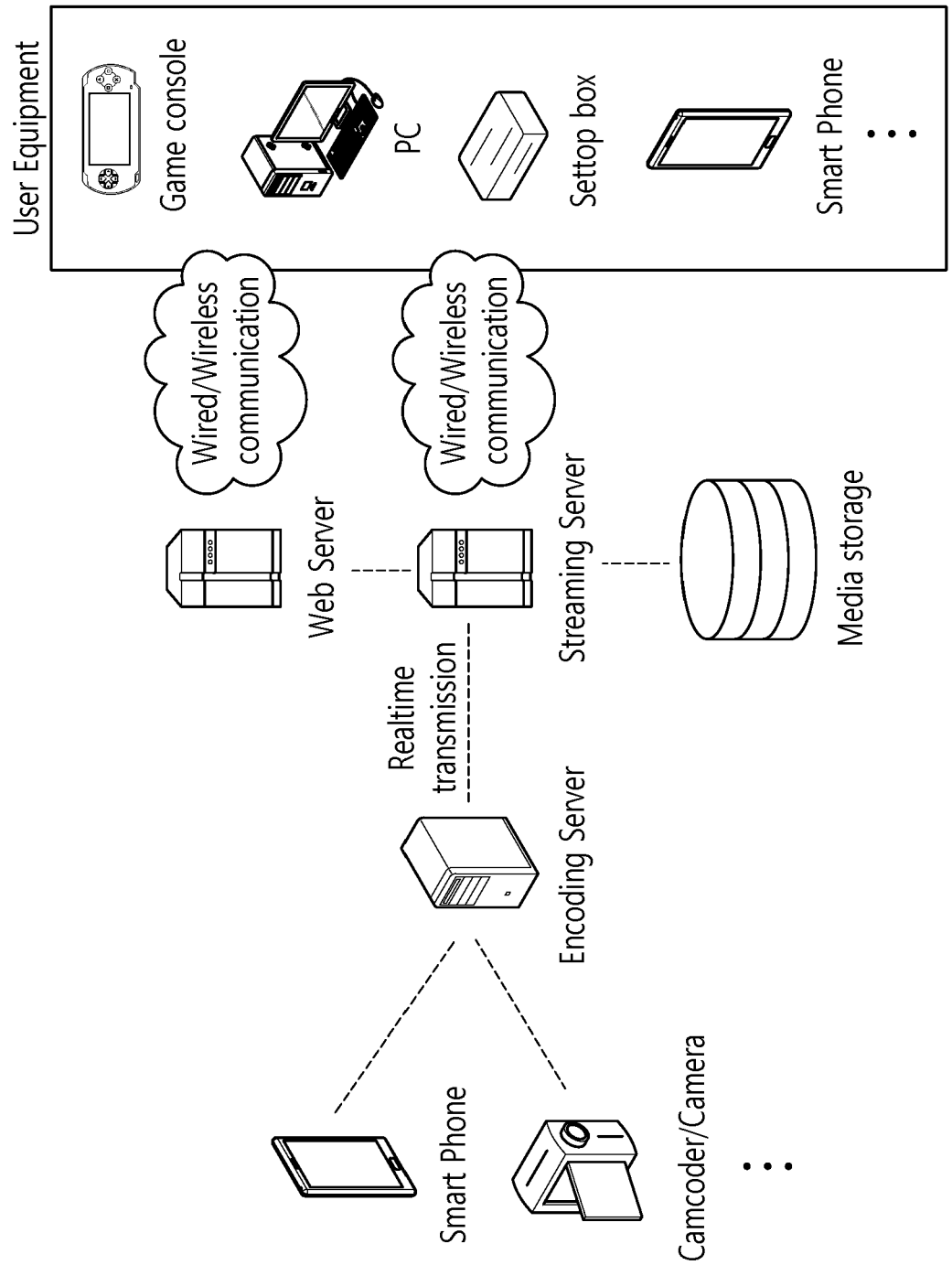
FIG. 10 illustrates a structural diagram of a contents streaming system to which the present disclosure is applied.

FIG. 10 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

The invention claimed is:
1. A method for generating a media file, the method comprising:
configuring first flag information for a target layer in an Output Layer Set (OLS), wherein the first flag information represents whether information on a maximum number of temporal sublayers for inter-layer prediction is present;
configuring second flag information on whether the target layer is an output layer;
configuring, based on the first flag information and the second flag information, the information on the maximum number of the temporal sublayers; and
configuring a media file including an operating points information sample group,
wherein the operating points information sample group includes the first flag information and the second flag information, and
wherein the information on the maximum number of the temporal sublayers is configured in the operating points information sample group based on both i) the first flag information being equal to 1 and ii) the second flag information being equal to 0.
2. The method of claim 1, wherein a value obtained by subtracting 1 from a value of the information on the maximum number of the temporal sublayers is derived as the maximum number of the temporal sublayers.

3. The method of claim 1, wherein the first flag information equal to 1 represents that the information on the maximum number of the temporal sublayers is able to be present, and wherein the first flag information equal to 0 represents that the information on the maximum number of the temporal sublayers is not present.

4. The method of claim 3, wherein the second flag information equal to 1 represents that the target layer is the output layer, and wherein the second flag information equal to 0 represents that the target layer is not the output layer.

5. The method of claim 1, wherein the operating points information sample group includes information on layer dependency and information on a list of operating points, and wherein the information on the layer dependency is signaled before the information on the list of the operating points in the operating points information sample group.

6. The method of claim 1, wherein the operating points information sample group includes information on a list of output layers in the OLS.

7. The method of claim 6, wherein the operating points information sample group does not include information on a list of layers other than an output layer in the OLS.

8. The method of claim 1, wherein the operating points information sample group includes information on a complete list of layers in the OLS.

9. The method of claim 8, wherein the operating points information sample group does not include information on layer dependency.

10. The method of claim 1, wherein the operating points information sample group does not include at least one of i) flag information on whether all layers are independently coded without using the inter-layer prediction, ii) flag information on whether each OLS includes only one output layer or iii) OLS mode index information representing a mode of each OLS.

11. A media file generating apparatus for generating a media file by performing the method of claim 1.

12. A method for processing a media file, the method comprising:

obtaining a media file comprising an operating points information sample group; and parsing the operating points information sample group, wherein parsing the operating points information sample group comprises, parsing first flag information for a target layer in an Output Layer Set (OLS), wherein the first flag information represents whether information on a maximum number of temporal sublayers for inter-layer prediction is present;

parsing second flag information on whether the target layer is an output layer; and parsing, based on the first flag information and the second flag information, the information on the maximum number of the temporal sublayers, wherein the operating points information sample group includes the first flag information and the second flag information, and wherein the information on the maximum number of the temporal sublayers is configured in the operating points information sample group based on both i) the first flag information being equal to 1 and ii) the second flag information being equal to 0.

13. The method of claim 12, wherein a value obtained by subtracting 1 from a value of the information on the maximum number of the temporal sublayers is derived as the maximum number of the temporal sublayers.

14. The method of claim 12, wherein the first flag information equal to 1 represents that the information on the maximum number of the temporal sublayers is able to be present, and wherein the first flag information equal to 0 represents that the information on the maximum number of the temporal sublayers is not present.

15. The method of claim 14, wherein the second flag information equal to 1 represents that the target layer is the output layer, wherein the second flag information equal to 0 represents that the target layer is not the output layer.

16. The method of claim 12, wherein the operating points information sample group includes information on a complete list of layers in the OLS.

17. A media file processing apparatus for processing a media file processed by performing the method of claim 12.

* * * * *